United States Patent
Peso Parada et al.

(10) Patent No.: US 11,726,596 B2
(45) Date of Patent: *Aug. 15, 2023

(54) CONTROLLER FOR USE IN A DEVICE COMPRISING FORCE SENSORS

(71) Applicant: Cirrus Logic International Semiconductor Ltd., Edinburgh (GB)

(72) Inventors: Pablo Peso Parada, Maidenhead (GB); Tom Birchall, London (GB); Hamid Sepehr, London (GB)

(73) Assignee: Cirrus Logic, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/161,268

(22) Filed: Jan. 28, 2021

(65) Prior Publication Data

US 2021/0157436 A1 May 27, 2021

Related U.S. Application Data

(63) Continuation of application No. 16/369,738, filed on Mar. 29, 2019, now Pat. No. 10,955,955.

(51) Int. Cl.
*G06F 3/041* (2006.01)
(52) U.S. Cl.
CPC .......... *G06F 3/0414* (2013.01); *G06F 3/0418* (2013.01)
(58) Field of Classification Search
CPC ..... G06F 3/0418; G06F 3/0414–04186; G06F 3/04164
See application file for complete search history.

(56) References Cited

U.S. PATENT DOCUMENTS

| 3,686,927 A | 8/1972 | Scharton |
| 4,902,136 A | 2/1990 | Mueller et al. |
| 5,374,896 A | 12/1994 | Sato et al. |
| 5,684,722 A | 11/1997 | Thorner et al. |
| 5,748,578 A | 5/1998 | Schell |
| 5,857,986 A | 1/1999 | Moriyasu |
| 6,050,393 A | 4/2000 | Murai et al. |
| 6,278,790 B1 | 8/2001 | Davis et al. |
| 6,294,891 B1 | 9/2001 | McConnell et al. |

(Continued)

FOREIGN PATENT DOCUMENTS

| CN | 103165328 A | 6/2013 |
| CN | 104811838 A | 7/2015 |

(Continued)

OTHER PUBLICATIONS

International Search Report and Written Opinion of the International Searching Authority, International Application No. PCT/US2021/021908, dated Jun. 9, 2021.

(Continued)

*Primary Examiner* — Temesghen Ghebretinsae
*Assistant Examiner* — Ivelisse Martinez Quiles
(74) *Attorney, Agent, or Firm* — Jackson Walker L.L.P.

(57) ABSTRACT

A controller for use in a device which comprises at least two force sensors in a given arrangement, the controller operable, based on input sensor signals derived from the force sensors, to carry out an arrangement-related operation in which an output sensor signal is generated based on at least two said input sensor signals and the arrangement of the force sensors in the device so that the output sensor signal is dependent on said arrangement.

19 Claims, 10 Drawing Sheets

(56) References Cited

U.S. PATENT DOCUMENTS

| | | |
|---|---|---|
| 6,332,029 B1 | 12/2001 | Azima et al. |
| 6,388,520 B2 | 5/2002 | Wada et al. |
| 6,567,478 B2 | 5/2003 | Oishi et al. |
| 6,580,796 B1 | 6/2003 | Kuroki |
| 6,683,437 B2 | 1/2004 | Tierling |
| 6,703,550 B2 | 3/2004 | Chu |
| 6,762,745 B1 | 7/2004 | Braun et al. |
| 6,768,779 B1 | 7/2004 | Nielsen |
| 6,784,740 B1 | 8/2004 | Tabatabaei |
| 6,816,833 B1 | 11/2004 | Iwamoto et al. |
| 6,906,697 B2 | 6/2005 | Rosenberg |
| 6,995,747 B2 | 2/2006 | Casebolt et al. |
| 7,042,286 B2 | 5/2006 | Meade et al. |
| 7,154,470 B2 | 12/2006 | Tierling |
| 7,277,678 B2 | 10/2007 | Rozenblit et al. |
| 7,333,604 B2 | 2/2008 | Zernovizky et al. |
| 7,392,066 B2 | 6/2008 | Hapamas |
| 7,623,114 B2 | 11/2009 | Rank |
| 7,639,232 B2 | 12/2009 | Grant et al. |
| 7,777,566 B1 | 8/2010 | Drogi et al. |
| 7,791,588 B2 | 9/2010 | Tierling et al. |
| 7,825,838 B1 | 11/2010 | Srinivas et al. |
| 7,979,146 B2 | 7/2011 | Ullrich et al. |
| 8,068,025 B2 | 11/2011 | Devenyi et al. |
| 8,098,234 B2 | 1/2012 | Lacroix et al. |
| 8,102,364 B2 | 1/2012 | Tierling |
| 8,325,144 B1 | 12/2012 | Tierling et al. |
| 8,427,286 B2 | 4/2013 | Grant et al. |
| 8,441,444 B2 | 5/2013 | Moore et al. |
| 8,466,778 B2 | 6/2013 | Hwang et al. |
| 8,480,240 B2 | 7/2013 | Kashiyama |
| 8,572,293 B2 | 10/2013 | Cruz-Hernandez et al. |
| 8,572,296 B2 | 10/2013 | Shasha et al. |
| 8,593,269 B2 | 11/2013 | Grant et al. |
| 8,648,659 B2 | 2/2014 | Oh et al. |
| 8,648,829 B2 | 2/2014 | Shahoian |
| 8,659,208 B1 | 2/2014 | Rose et al. |
| 8,754,757 B1 | 6/2014 | Ullrich et al. |
| 8,754,758 B1 | 6/2014 | Ullrich et al. |
| 8,947,216 B2 | 2/2015 | Da Costa et al. |
| 8,981,915 B2 | 3/2015 | Birnbaum et al. |
| 8,994,518 B2 | 3/2015 | Gregorio et al. |
| 9,019,087 B2 | 4/2015 | Bakircioglu et al. |
| 9,030,428 B2 | 5/2015 | Fleming |
| 9,063,570 B2 | 6/2015 | Weddle et al. |
| 9,070,856 B1 | 6/2015 | Rose et al. |
| 9,083,821 B2 | 7/2015 | Hughes |
| 9,092,059 B2 | 7/2015 | Bhatia |
| 9,117,347 B2 | 8/2015 | Matthews |
| 9,128,523 B2 | 9/2015 | Buuck et al. |
| 9,164,587 B2 | 10/2015 | Da Costa et al. |
| 9,196,135 B2 | 11/2015 | Shah et al. |
| 9,248,840 B2 | 2/2016 | Truong |
| 9,326,066 B2 | 4/2016 | Kilppel |
| 9,329,721 B1 | 5/2016 | Buuck et al. |
| 9,354,704 B2 | 5/2016 | Lacroix et al. |
| 9,368,005 B2 | 6/2016 | Cruz-Hernandez et al. |
| 9,489,047 B2 | 11/2016 | Jiang et al. |
| 9,495,013 B2 | 11/2016 | Underkoffler et al. |
| 9,507,423 B2 | 11/2016 | Gandhi et al. |
| 9,513,709 B2 | 12/2016 | Gregorio et al. |
| 9,520,036 B1 | 12/2016 | Buuck |
| 9,588,586 B2 | 3/2017 | Rihn |
| 9,640,047 B2 | 5/2017 | Choi et al. |
| 9,652,041 B2 | 5/2017 | Jiang et al. |
| 9,696,859 B1 | 7/2017 | Heller et al. |
| 9,697,450 B1 | 7/2017 | Lee |
| 9,715,300 B2 | 7/2017 | Sinclair et al. |
| 9,740,381 B1 | 8/2017 | Chaudhri et al. |
| 9,842,476 B2 | 12/2017 | Rihn et al. |
| 9,864,567 B2 | 1/2018 | Seo |
| 9,881,467 B2 | 1/2018 | Levesque |
| 9,886,829 B2 | 2/2018 | Levesque |
| 9,946,348 B2 | 4/2018 | Ullrich et al. |
| 9,947,186 B2 | 4/2018 | Macours |
| 9,959,744 B2 | 5/2018 | Koskan et al. |
| 9,965,092 B2 | 5/2018 | Smith |
| 10,032,550 B1 | 7/2018 | Zhang et al. |
| 10,039,080 B2 | 7/2018 | Miller et al. |
| 10,055,950 B2 | 8/2018 | Saboune et al. |
| 10,074,246 B2 | 9/2018 | Da Costa et al. |
| 10,102,722 B2 | 10/2018 | Levesque et al. |
| 10,110,152 B1 | 10/2018 | Hajati |
| 10,171,008 B2 | 1/2019 | Nishitani et al. |
| 10,175,763 B2 | 1/2019 | Shah |
| 10,191,579 B2 | 1/2019 | Forlines et al. |
| 10,264,348 B1 | 4/2019 | Harris et al. |
| 10,402,031 B2 | 9/2019 | Vandermeijden et al. |
| 10,564,727 B2 | 2/2020 | Billington et al. |
| 10,620,704 B2 | 4/2020 | Rand et al. |
| 10,667,051 B2 | 5/2020 | Stahl |
| 10,726,683 B1 | 7/2020 | Mondello et al. |
| 10,735,956 B2 | 8/2020 | Bae et al. |
| 10,782,785 B2 | 9/2020 | Hu et al. |
| 10,795,443 B2 | 10/2020 | Hu et al. |
| 10,820,100 B2 | 10/2020 | Stahl et al. |
| 10,828,672 B2 | 11/2020 | Stahl et al. |
| 10,832,537 B2 | 11/2020 | Doy et al. |
| 10,841,696 B2 | 11/2020 | Mamou-Mani |
| 10,848,886 B2 | 11/2020 | Rand |
| 10,860,202 B2 | 12/2020 | Sepehr et al. |
| 10,955,955 B2 * | 3/2021 | Peso Parada ....... G06F 3/04164 |
| 10,969,871 B2 | 4/2021 | Rand et al. |
| 10,976,825 B2 | 4/2021 | Das et al. |
| 11,069,206 B2 | 7/2021 | Rao et al. |
| 11,079,874 B2 | 8/2021 | Lapointe et al. |
| 11,139,767 B2 | 10/2021 | Janko et al. |
| 11,150,733 B2 | 10/2021 | Das et al. |
| 11,259,121 B2 | 2/2022 | Lindemann et al. |
| 11,460,526 B1 | 10/2022 | Foo et al. |
| 2001/0043714 A1 | 11/2001 | Asada et al. |
| 2002/0018578 A1 | 2/2002 | Burton |
| 2002/0085647 A1 | 7/2002 | Oishi et al. |
| 2003/0068053 A1 | 4/2003 | Chu |
| 2003/0214485 A1 | 11/2003 | Roberts |
| 2005/0031140 A1 | 2/2005 | Browning |
| 2005/0134562 A1 | 6/2005 | Grant et al. |
| 2005/0195919 A1 | 9/2005 | Cova |
| 2006/0028095 A1 | 2/2006 | Maruyama et al. |
| 2006/0197753 A1 | 9/2006 | Hotelling |
| 2007/0013337 A1 | 1/2007 | Liu et al. |
| 2007/0024254 A1 | 2/2007 | Radecker et al. |
| 2007/0241816 A1 | 10/2007 | Okazaki et al. |
| 2008/0077367 A1 | 3/2008 | Odajima |
| 2008/0226109 A1 | 9/2008 | Yamakata et al. |
| 2008/0240458 A1 | 10/2008 | Goldstein et al. |
| 2008/0293453 A1 | 11/2008 | Atlas et al. |
| 2008/0316181 A1 | 12/2008 | Nurmi |
| 2009/0020343 A1 | 1/2009 | Rothkopf et al. |
| 2009/0079690 A1 | 3/2009 | Watson et al. |
| 2009/0088220 A1 | 4/2009 | Persson |
| 2009/0096632 A1 | 4/2009 | Ullrich et al. |
| 2009/0102805 A1 | 4/2009 | Meijer et al. |
| 2009/0128306 A1 | 5/2009 | Luden et al. |
| 2009/0153499 A1 | 6/2009 | Kim et al. |
| 2009/0189867 A1 | 7/2009 | Krah |
| 2009/0278819 A1 | 11/2009 | Goldenberg et al. |
| 2009/0313542 A1 | 12/2009 | Cruz-Hernandez et al. |
| 2010/0013761 A1 | 1/2010 | Birnbaum et al. |
| 2010/0080331 A1 | 4/2010 | Garudadr et al. |
| 2010/0085317 A1 | 4/2010 | Park et al. |
| 2010/0141408 A1 | 6/2010 | Doy et al. |
| 2010/0141606 A1 | 6/2010 | Bae et al. |
| 2010/0260371 A1 | 10/2010 | Afshar |
| 2010/0261526 A1 | 10/2010 | Anderson et al. |
| 2011/0056763 A1 | 3/2011 | Tanase et al. |
| 2011/0075835 A1 | 3/2011 | Hill |
| 2011/0077055 A1 | 3/2011 | Pakula et al. |
| 2011/0141052 A1 | 6/2011 | Bernstein et al. |
| 2011/0161537 A1 | 6/2011 | Chang |
| 2011/0163985 A1 | 7/2011 | Bae et al. |
| 2011/0167391 A1 | 7/2011 | Momeyer et al. |
| 2012/0011436 A1 | 1/2012 | Jinkinson et al. |
| 2012/0105358 A1 | 5/2012 | Momeyer et al. |

(56) References Cited

U.S. PATENT DOCUMENTS

| | | |
|---|---|---|
| 2012/0105367 A1 | 5/2012 | Son et al. |
| 2012/0112894 A1 | 5/2012 | Yang et al. |
| 2012/0206246 A1 | 8/2012 | Cruz-Hernandez et al. |
| 2012/0206247 A1 | 8/2012 | Bhatia et al. |
| 2012/0229264 A1 | 9/2012 | Company Bosch et al. |
| 2012/0249462 A1 | 10/2012 | Flanagan et al. |
| 2012/0253698 A1 | 10/2012 | Cokonaj |
| 2012/0306631 A1 | 12/2012 | Hughes |
| 2013/0016855 A1 | 1/2013 | Lee et al. |
| 2013/0027359 A1 | 1/2013 | Schevin et al. |
| 2013/0038792 A1 | 2/2013 | Quigley et al. |
| 2013/0096849 A1 | 4/2013 | Campbell et al. |
| 2013/0141382 A1 | 6/2013 | Simmons et al. |
| 2013/0275058 A1 | 10/2013 | Awad |
| 2013/0289994 A1 | 10/2013 | Newman et al. |
| 2013/0307786 A1 | 11/2013 | Heubel |
| 2014/0035736 A1 | 2/2014 | Weddle et al. |
| 2014/0056461 A1 | 2/2014 | Afshar |
| 2014/0064516 A1 | 3/2014 | Cruz-Hernandez et al. |
| 2014/0079248 A1 | 3/2014 | Short et al. |
| 2014/0085064 A1 | 3/2014 | Crawley et al. |
| 2014/0118125 A1 | 5/2014 | Bhatia |
| 2014/0118126 A1 | 5/2014 | Garg et al. |
| 2014/0119244 A1 | 5/2014 | Steer et al. |
| 2014/0125467 A1 | 5/2014 | Da Costa et al. |
| 2014/0139327 A1 | 5/2014 | Bau et al. |
| 2014/0176415 A1 | 6/2014 | Buuck |
| 2014/0205260 A1 | 7/2014 | Lacroix et al. |
| 2014/0222377 A1 | 8/2014 | Bitan et al. |
| 2014/0226068 A1 | 8/2014 | Lacroix et al. |
| 2014/0253303 A1 | 9/2014 | Levesque |
| 2014/0292501 A1 | 10/2014 | Lim et al. |
| 2014/0300454 A1 | 10/2014 | Lacroix et al. |
| 2014/0340209 A1 | 11/2014 | Lacroix et al. |
| 2014/0347176 A1 | 11/2014 | Modarres et al. |
| 2015/0049882 A1 | 2/2015 | Chiu et al. |
| 2015/0061846 A1 | 3/2015 | Yliaho |
| 2015/0070149 A1 | 3/2015 | Cruz-Hernandez et al. |
| 2015/0070151 A1 | 3/2015 | Cruz-Hernandez et al. |
| 2015/0070154 A1 | 3/2015 | Levesque et al. |
| 2015/0070260 A1 | 3/2015 | Saboune et al. |
| 2015/0077324 A1 | 3/2015 | Birnbaum et al. |
| 2015/0084752 A1 | 3/2015 | Heubel et al. |
| 2015/0116205 A1 | 4/2015 | Westerman et al. |
| 2015/0130767 A1 | 5/2015 | Myers et al. |
| 2015/0204925 A1 | 7/2015 | Hernandez et al. |
| 2015/0208189 A1 | 7/2015 | Tsai |
| 2015/0216762 A1 | 8/2015 | Oohashi et al. |
| 2015/0234464 A1 | 8/2015 | Yliaho |
| 2015/0264455 A1 | 9/2015 | Granoto et al. |
| 2015/0268768 A1 | 9/2015 | Woodhull et al. |
| 2015/0324116 A1 | 11/2015 | Marsden et al. |
| 2015/0325116 A1 | 11/2015 | Umminger, III |
| 2015/0339898 A1 | 11/2015 | Saboune et al. |
| 2015/0341714 A1 | 11/2015 | Ahn et al. |
| 2015/0356981 A1 | 12/2015 | Johnson et al. |
| 2016/0004311 A1 | 1/2016 | Yliaho |
| 2016/0007095 A1 | 1/2016 | Lacroix |
| 2016/0063826 A1 | 3/2016 | Morrell et al. |
| 2016/0070392 A1 | 3/2016 | Wang et al. |
| 2016/0074278 A1 | 3/2016 | Muench et al. |
| 2016/0097662 A1 | 4/2016 | Chang et al. |
| 2016/0132118 A1 | 5/2016 | Park et al. |
| 2016/0162031 A1 | 6/2016 | Westerman et al. |
| 2016/0179203 A1 | 6/2016 | Modarres et al. |
| 2016/0187987 A1 | 6/2016 | Ulrich et al. |
| 2016/0239089 A1 | 8/2016 | Taninaka et al. |
| 2016/0246378 A1 | 8/2016 | Sampanes et al. |
| 2016/0277821 A1 | 9/2016 | Kunimoto |
| 2016/0291731 A1 | 10/2016 | Liu et al. |
| 2016/0305996 A1 | 10/2016 | Martens et al. |
| 2016/0328065 A1 | 11/2016 | Johnson et al. |
| 2016/0358605 A1 | 12/2016 | Ganong, III et al. |
| 2017/0052593 A1 | 2/2017 | Jiang et al. |
| 2017/0078804 A1 | 3/2017 | Guo et al. |
| 2017/0083096 A1 | 3/2017 | Rihn et al. |
| 2017/0090572 A1 | 3/2017 | Holenarsipur et al. |
| 2017/0090573 A1 | 3/2017 | Hajati et al. |
| 2017/0097381 A1 | 4/2017 | Stephens et al. |
| 2017/0153760 A1 | 6/2017 | Chawda et al. |
| 2017/0168574 A1 | 6/2017 | Zhang |
| 2017/0168773 A1 | 6/2017 | Keller et al. |
| 2017/0169674 A1 | 6/2017 | Macours |
| 2017/0180863 A1 | 6/2017 | Biggs et al. |
| 2017/0220197 A1 | 8/2017 | Matsumoto et al. |
| 2017/0256145 A1 | 9/2017 | Macours et al. |
| 2017/0277350 A1 | 9/2017 | Wang et al. |
| 2017/0031495 A1 | 12/2017 | Tse |
| 2017/0357440 A1 | 12/2017 | Tse |
| 2018/0021811 A1 | 1/2018 | Kutej et al. |
| 2018/0033946 A1 | 2/2018 | Kemppinen et al. |
| 2018/0059733 A1 | 3/2018 | Gault et al. |
| 2018/0059793 A1 | 3/2018 | Hajati |
| 2018/0067557 A1 | 3/2018 | Robert et al. |
| 2018/0074637 A1 | 3/2018 | Rosenberg et al. |
| 2018/0082673 A1 | 3/2018 | Tzanetos |
| 2018/0084362 A1 | 3/2018 | Zhang et al. |
| 2018/0095596 A1 | 4/2018 | Turgeman |
| 2018/0151036 A1 | 5/2018 | Cha et al. |
| 2018/0158289 A1 | 6/2018 | Vasilev et al. |
| 2018/0159452 A1 | 6/2018 | Eke et al. |
| 2018/0159457 A1 | 6/2018 | Eke |
| 2018/0159545 A1 | 6/2018 | Eke et al. |
| 2018/0160227 A1 | 6/2018 | Lawrence et al. |
| 2018/0165925 A1 | 6/2018 | Israr et al. |
| 2018/0178114 A1 | 6/2018 | Mizuta et al. |
| 2018/0182212 A1 | 6/2018 | Li et al. |
| 2018/0183372 A1 | 6/2018 | Li et al. |
| 2018/0194369 A1 | 7/2018 | Lisseman et al. |
| 2018/0196567 A1 | 7/2018 | Klein et al. |
| 2018/0224963 A1 | 8/2018 | Lee et al. |
| 2018/0227063 A1 | 8/2018 | Heubel et al. |
| 2018/0237033 A1 | 8/2018 | Hakeem et al. |
| 2018/0206282 A1 | 9/2018 | Singh |
| 2018/0253123 A1 | 9/2018 | Levesque et al. |
| 2018/0255411 A1 | 9/2018 | Lin et al. |
| 2018/0267897 A1 | 9/2018 | Jeong |
| 2018/0294757 A1 | 10/2018 | Feng et al. |
| 2018/0301060 A1 | 10/2018 | Israr et al. |
| 2018/0304310 A1 | 10/2018 | Long |
| 2018/0321056 A1 | 11/2018 | Yoo et al. |
| 2018/0321748 A1 | 11/2018 | Rao et al. |
| 2018/0323725 A1 | 11/2018 | Cox et al. |
| 2018/0329172 A1 | 11/2018 | Tabuchi |
| 2018/0335848 A1 | 11/2018 | Moussette et al. |
| 2018/0367897 A1 | 12/2018 | Bjork et al. |
| 2019/0020760 A1 | 1/2019 | DeBates et al. |
| 2019/0035235 A1 | 1/2019 | Da Costa et al. |
| 2019/0227628 A1 | 1/2019 | Rand et al. |
| 2019/0044651 A1 | 2/2019 | Nakada |
| 2019/0051229 A1 | 2/2019 | Ozguner et al. |
| 2019/0064925 A1 | 2/2019 | Kim et al. |
| 2019/0069088 A1 | 2/2019 | Seiler |
| 2019/0073078 A1 | 3/2019 | Sheng et al. |
| 2019/0102031 A1* | 4/2019 | Shutzberg ............ G06F 3/0414 |
| 2019/0103829 A1 | 4/2019 | Vasudevan et al. |
| 2019/0138098 A1 | 5/2019 | Shah |
| 2019/0163234 A1 | 5/2019 | Kim et al. |
| 2019/0196596 A1 | 6/2019 | Yokoyama et al. |
| 2019/0206396 A1 | 7/2019 | Chen |
| 2019/0215349 A1 | 7/2019 | Adams et al. |
| 2019/0220095 A1 | 7/2019 | Ogita et al. |
| 2019/0228619 A1 | 7/2019 | Yokoyama et al. |
| 2019/0114496 A1 | 8/2019 | Lesso |
| 2019/0235629 A1 | 8/2019 | Hu et al. |
| 2019/0253031 A1 | 8/2019 | Vellanki et al. |
| 2019/0294247 A1 | 9/2019 | Hu et al. |
| 2019/0295755 A1 | 9/2019 | Konradi et al. |
| 2019/0296674 A1 | 9/2019 | Janko et al. |
| 2019/0297418 A1 | 9/2019 | Stahl |
| 2019/0305851 A1 | 10/2019 | Vegas-Olmos et al. |
| 2019/0311590 A1 | 10/2019 | Doy et al. |
| 2019/0341903 A1 | 11/2019 | Kim |
| 2019/0384393 A1 | 12/2019 | Cruz-Hernandez et al. |

(56) References Cited

U.S. PATENT DOCUMENTS

| | | | |
|---|---|---|---|
| 2019/0384898 | A1 | 12/2019 | Chen et al. |
| 2020/0117506 | A1 | 4/2020 | Chan |
| 2020/0139403 | A1 | 5/2020 | Palit |
| 2020/0150767 | A1 | 5/2020 | Karimi Eskandary et al. |
| 2020/0218352 | A1 | 7/2020 | Macours et al. |
| 2020/0231085 | A1 | 7/2020 | Kunii et al. |
| 2020/0306796 | A1 | 10/2020 | Lindemann et al. |
| 2020/0313529 | A1 | 10/2020 | Lindemann |
| 2020/0313654 | A1 | 10/2020 | Marchais et al. |
| 2020/0314969 | A1 | 10/2020 | Marchais et al. |
| 2020/0348249 | A1 | 11/2020 | Marchais et al. |
| 2020/0403546 | A1 | 12/2020 | Janko et al. |
| 2021/0108975 | A1 | 4/2021 | Parada et al. |
| 2021/0125469 | A1 | 4/2021 | Alderson |
| 2021/0153562 | A1 | 5/2021 | Fishwick et al. |
| 2021/0157436 | A1 | 5/2021 | Peso Parada et al. |
| 2021/0174777 | A1 | 6/2021 | Marchais et al. |
| 2021/0175869 | A1 | 6/2021 | Taipale |
| 2021/0200316 | A1 | 7/2021 | Das et al. |
| 2021/0325967 | A1 | 10/2021 | Khenkin et al. |
| 2021/0328535 | A1 | 10/2021 | Khenkin et al. |
| 2021/0365118 | A1 | 11/2021 | Rajapurkar et al. |
| 2022/0026989 | A1 | 1/2022 | Rao et al. |
| 2022/0328752 | A1 | 10/2022 | Lesso et al. |
| 2022/0404398 | A1 | 12/2022 | Reynaga et al. |
| 2022/0408181 | A1 | 12/2022 | Hendrix et al. |

FOREIGN PATENT DOCUMENTS

| | | |
|---|---|---|
| CN | 107835968 A | 3/2018 |
| CN | 210628147 U | 5/2020 |
| CN | 114237414 A | 3/2022 |
| EP | 0784844 B1 | 6/2005 |
| EP | 2306269 A1 | 4/2011 |
| EP | 2363785 A1 | 9/2011 |
| EP | 2487780 A1 | 8/2012 |
| EP | 2600225 A1 | 6/2013 |
| EP | 2846218 A1 | 3/2015 |
| EP | 2846229 A2 | 3/2015 |
| EP | 2846329 A1 | 3/2015 |
| EP | 2988528 A1 | 2/2016 |
| EP | 3125508 A1 | 2/2017 |
| EP | 3379382 A1 | 9/2018 |
| JP | 08149006 A | 6/1996 |
| JP | H10184782 A | 7/1998 |
| WO | 2013104919 A1 | 7/2013 |
| WO | 2014018086 A1 | 1/2014 |
| WO | 2014094283 A1 | 6/2014 |
| WO | 2016105496 A1 | 6/2016 |
| WO | 2016164193 A1 | 10/2016 |
| WO | 2017034973 A1 | 3/2017 |
| WO | 2017113651 A1 | 7/2017 |
| WO | 2018053159 A1 | 3/2018 |
| WO | 2018067613 A1 | 4/2018 |
| WO | 2018125347 A1 | 7/2018 |
| WO | 2020055405 A1 | 3/2020 |

OTHER PUBLICATIONS

Notice of Preliminary Rejection, Korean Intellectual Property Office, Application No. 10-2019-7036236, dated Jun. 29, 2021.
Combined Search and Examination Report, United Kingdom Intellectual Property Office, Application No. 3B2018051.9, dated Jun. 30, 2021.
Communication pursuant to Rule 164(2)(b) and Article 94(3) EPC, European Patent Office, Application No. 18727512.8, dated Jul. 8, 2021.
Gottfried Behler: "Measuring the Loudspeaker's Impedance during Operation for the Derivation of the Voice Coil Temperature", AES Convention Preprint, Feb. 25, 1995 (Feb. 25, 1995), PARIS.
First Office Action, China National Intellectual Property Administration, Patent Application No. 2019800211287, dated Jul. 5, 2021.
Examination Report under Section 18(3), United Kingdom Intellectual Property Office, Application No. GB2106247.6, dated Mar. 31, 2022.
Final Notice of Preliminary Rejection, Korean Patent Office, Application No. 10-2019-7036236, dated Nov. 29, 2021.
Examination Report under Section 18(3), United Kingdom Intellectual Property Office, Application No. GB2018050.1, dated Dec. 22, 2021.
Examination Report under Section 18(3), United Kingdom Intellectual Property Office, Application No. GB2018051.9, dated Nov. 5, 2021.
Second Office Action, National Intellectual Property Administration, PRC, Application No. 2019800208570, dated Jan. 19, 2022.
Steinbach et al., Haptic Data Compression and Communication, IEEE Signal Processing Magazine, Jan. 2011.
Pezent et al., Syntacts Open-Source Software and Hardware for Audio-Controlled Haptics, IEEE Transactions on Haptics, vol. 14, No. 1, Jan.-Mar. 2021.
Danieau et al., Enhancing Audiovisual Experience with Haptic Feedback: A Survey on HAV, IEEE Transactions on Haptics, vol. 6, No. 2, Apr.-Jun. 2013.
Danieau et al., Toward Haptic Cinematography: Enhancing Movie Experiences with Camera-Based Haptic Effects, IEEE Computer Society, IEEE MultiMedia, Apr.-Jun. 2014.
Jaijongrak et al., A Haptic and Auditory Assistive User Interface: Helping the Blinds on their Computer Dperations, 2011 IEEE International Conference on Rehabilitation Robotics, Rehab Week Zurich, ETH Zurich Science City, Switzerland, Jun. 29-Jul. 1, 2011.
Lim et al., An Audio-Haptic Feedbacks for Enhancing User Experience in Mobile Devices, 2013 IEEE International Conference on Consumer Electronics (ICCE).
Meddle et al., How Does Audio-Haptic Enhancement Influence Emotional Response to Mobile Media, 2013 Fifth International Workshop on Quality of Multimedia Experience (QoMEX), QMEX 2013.
Invitation to Pay Additional Fees, Partial International Search Report and Provisional Opinion of the International Searching Authority, International Application No. PCT/US2020/052537, dated Jan. 14, 2021.
International Search Report and Written Opinion of the International Searching Authority, International Application No. PCT/US2020/056610, dated Jan. 21, 2021.
International Search Report and Written Opinion of the International Searching Authority, International Application No. PCT/GB2020/052537, dated Mar. 9, 2021.
Office Action of the Intellectual Property Office, ROC (Taiwan) Patent Application No. 107115475, dated Apr. 30, 2021.
First Office Action, China National Intellectual Property Administration, Patent Application No. 2019800208570, dated Jun. 3, 2021.
International Search Report and Written Opinion of the International Searching Authority, International Application No. PCT/GB2019/050964, dated Sep. 3, 2019.
Combined Search and Examination Report, UKIPO, Application No. GB1720424.9, dated Jun. 5, 2018.
International Search Report and Written Opinion of the International Searching Authority, International Application No. PCT/GB2019/052991, dated Mar. 17, 2020, received by Applicant Mar. 19, 2020.
Communication Relating to the Results of the Partial International Search, and Provisional Opinion Accompanying the Partial Search Result, of the International Searching Authority, International Application No. PCT/GB2020/050822, dated Jul. 9, 2020.
International Search Report and Written Opinion of the International Searching Authority, International Application No. PCT/US2020/024864, dated Jul. 6, 2020.
International Search Report and Written Opinion of the International Searching Authority, International Application No. PCT/GB2020/051035, dated Jul. 10, 2020.
International Search Report and Written Opinion of the International Searching Authority, International Application No. PCT/GB2020/050823, dated Jun. 30, 2020.

(56) References Cited

OTHER PUBLICATIONS

International Search Report and Written Opinion of the International Searching Authority, International Application No. PCT/GB2020/051037, dated Jul. 9, 2020.
International Search Report and Written Opinion of the International Searching Authority, International Application No. PCT/GB2020/050822, dated Aug. 31, 2020.
International Search Report and Written Opinion of the International Searching Authority, International Application No. PCT/GB2020/051438, dated Sep. 28, 2020.
Combined Search and Examination Report under Sections 17 and 18(3), UKIPO, Application No. GB2210174.5, dated Aug. 1, 2022.
Examination Report under Sections 17 and 18(3), UKIPO, Application No. GB2112207.2, dated Aug. 18, 2022.
International Search Report and Written Opinion of the International Searching Authority, International Application No. PCT/US2022/030541, dated Sep. 1, 2022.
Vanderborght, B. et al., Variable impedance actuators: A review; Robotics and Autonomous Systems 61, Aug. 6, 2013, pp. 1601-1614.
International Search Report and Written Opinion of the International Searching Authority, International Application No. PCT/US2022/033190, dated Sep. 8, 2022.
International Search Report and Written Opinion of the International Searching Authority, International Application No. PCT/US2022/033230, dated Sep. 15, 2022.
Examination Report under Section 18(3), UKIPO, Application No. GB2115048.7, dated Aug. 24, 2022.
Communication pursuant to Article 94(3) EPC, European Patent Office, Application No. 18727512.8, dated Sep. 26, 2022.
Examination Report under Section 18(3), UKIPO, Application No. GB2113228.7, dated Feb. 10, 2023.
Examination Report under Section 18(3), UKIPO, Application No. GB2113154.5, dated Feb. 17, 2023.
First Office Action, China National Intellectual Property Administration, Application No. 2019107179621, dated Jan. 19, 2023.
Search Report, China National Intellectual Property Administration, Application No. 2019107179621, dated Jan. 11, 2023.
Examination Report under Section 18(3), UKIPO, Application No. GB2112207.2, dated Nov. 7, 2022.
Examination Report, Intellectual Property India, Application No. 202117019138, dated Jan. 4, 2023.
Examination Report under Section 18(3), UKIPO, Application No. GB2117488.3, dated Apr. 27, 2023.

\* cited by examiner

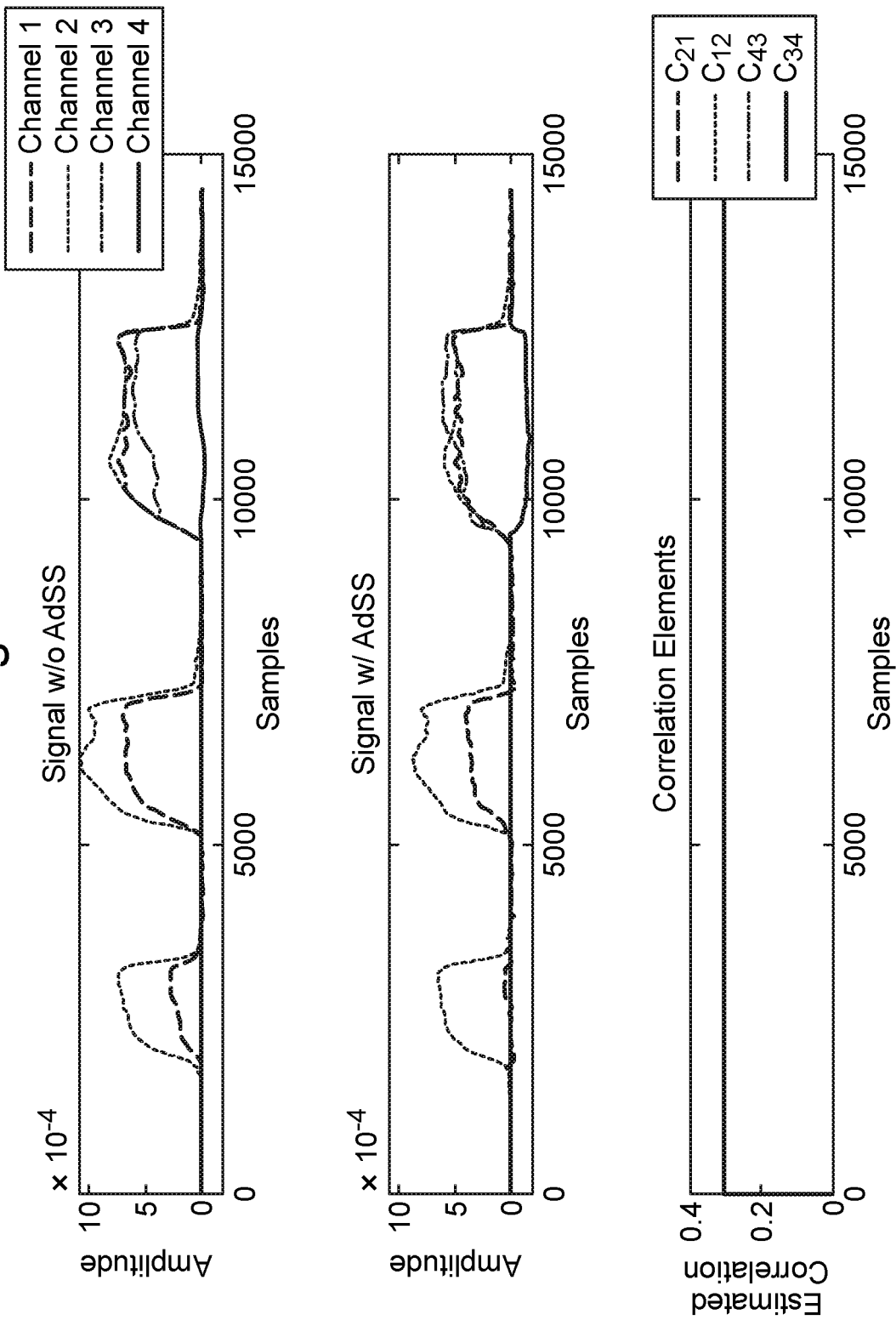

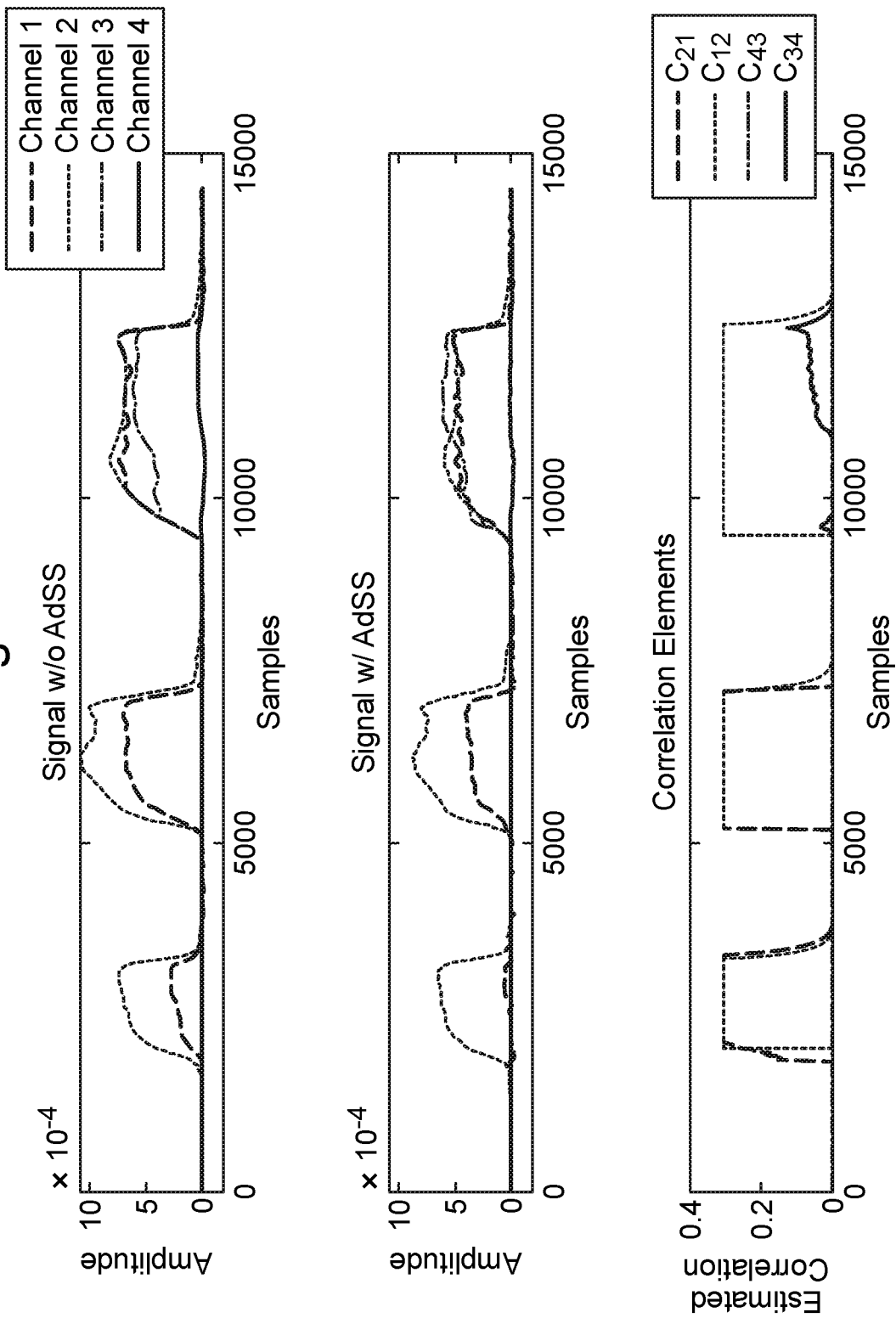

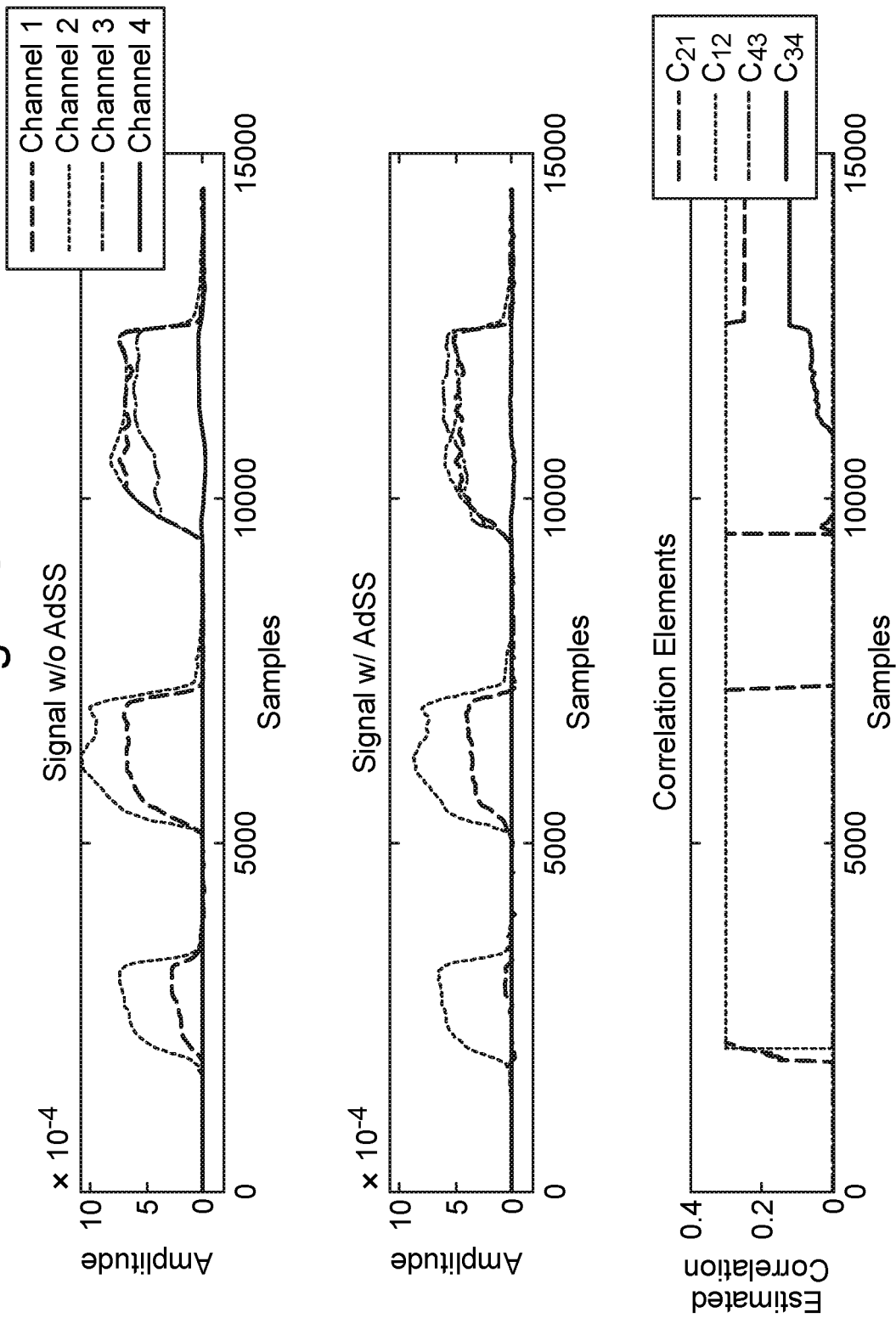

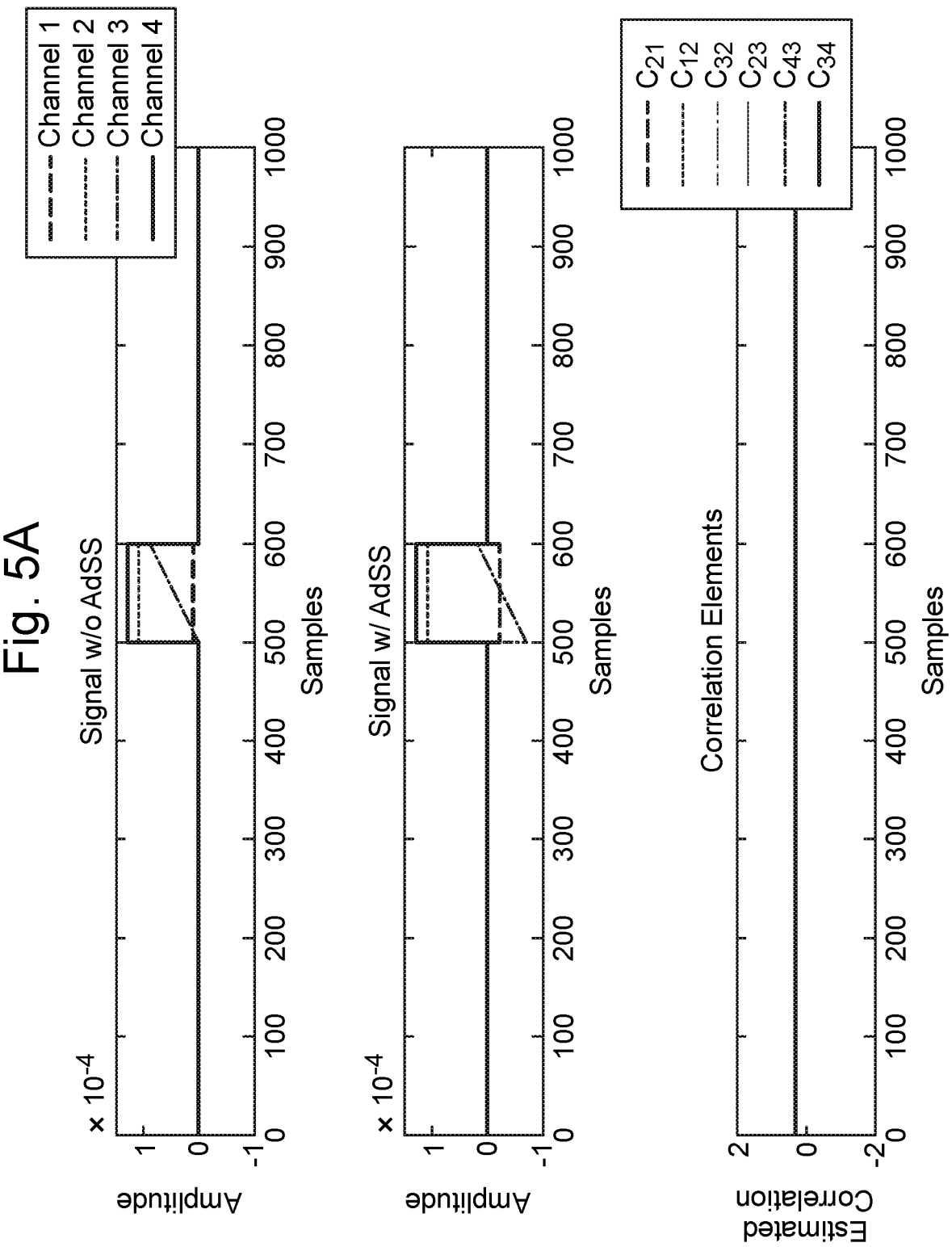

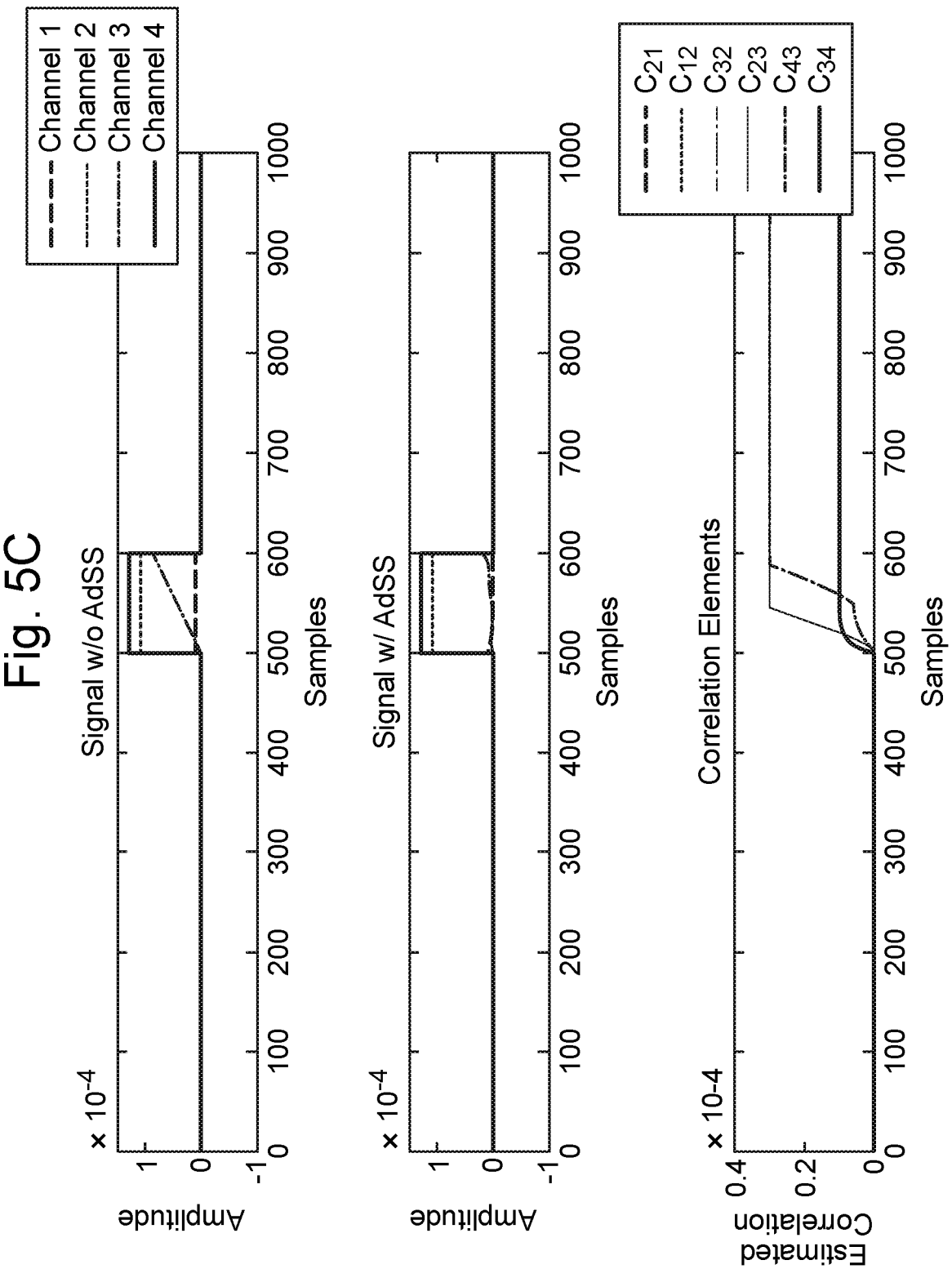

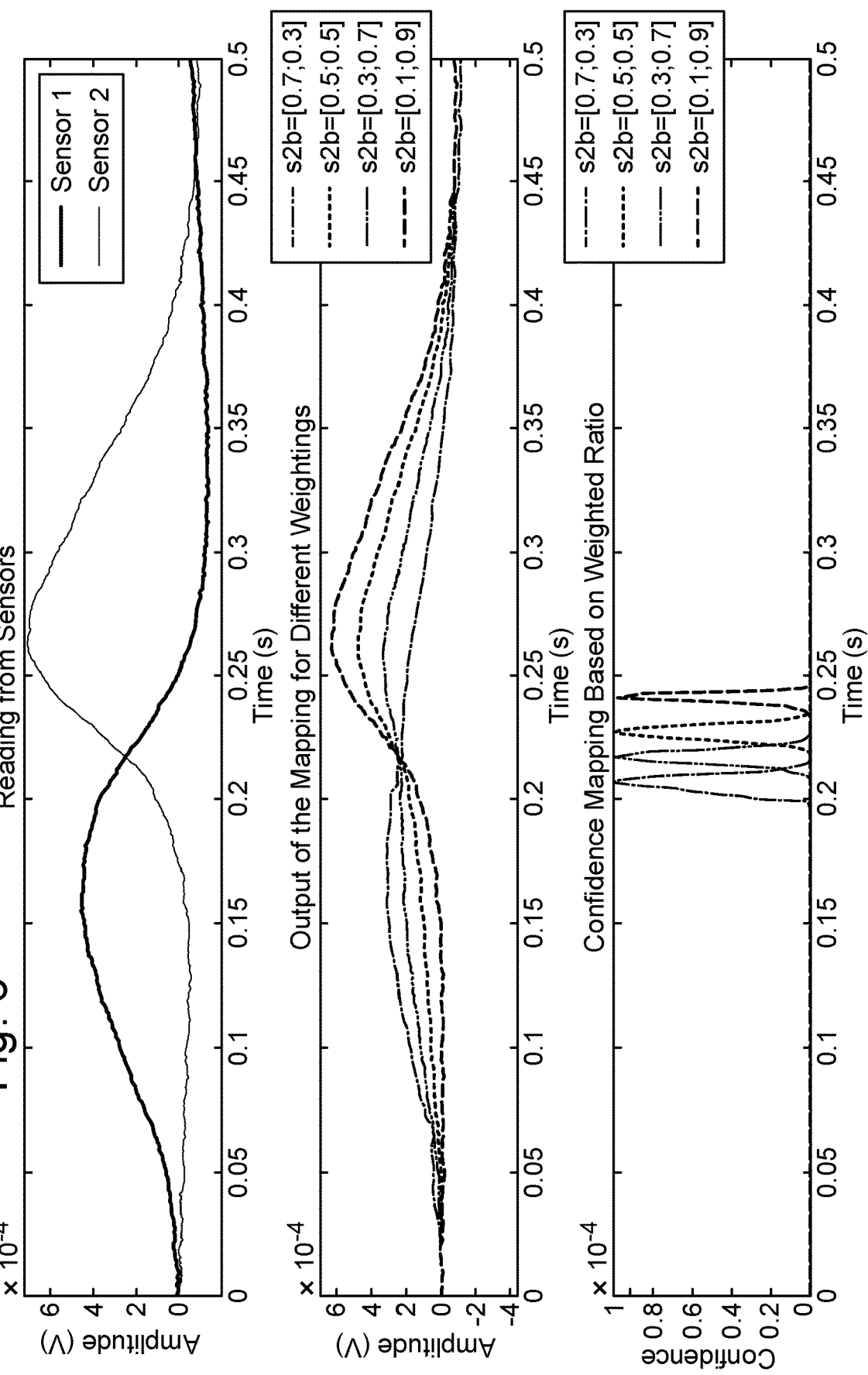

CONTROLLER FOR USE IN A DEVICE COMPRISING FORCE SENSORS

The present disclosure is a continuation of United States Non-Provisional Patent Application No. 16/369738, filed Mar. 29, 2019, which is incorporated by reference herein in its entirety.

FIELD OF DISCLOSURE

The present disclosure relates in general to a controller for use in a device comprising force sensors. Such a device may be a portable electrical or electronic device.

The present disclosure extends to the device comprising the controller and to corresponding methods and computer programs.

BACKGROUND

Force sensors are known as possible input transducers for devices such as portable electrical or electronic devices, and can be used as alternatives to traditional mechanical switches. Such sensors detect forces on the device to determine user interaction, e.g. touches or presses of the device.

It is desirable to process the sensor signals originating from such force sensors in a convenient and useful manner.

SUMMARY

According to a first aspect of the present disclosure, there is provided a controller for use in a device which comprises at least two force sensors in a given arrangement, the controller operable, based on input sensor signals derived from the force sensors, to carry out an arrangement-related operation in which an output sensor signal is generated based on at least two said input sensor signals and the arrangement of the force sensors in the device so that the output sensor signal is dependent on said arrangement.

The arrangement of the force sensors in the device may be referred to as a topology of the device, and as such the arrangement-related operation may be referred to as a topology-dependent operation or a device-topology operation. The input sensor signals may be derived from the force sensors in the sense that they are produced by the force sensors or derived from signals produced by the force sensors. The input sensor signals may have a one-to-one relationship with the force sensors or a one-to-many relationship e.g. where they are generated based on a combination of sensor signals produced by the respective force sensors.

By generating the output sensor signal dependent on the arrangement of the force sensors in the device it is possible to take account of that arrangement, for example to compensate for the effect of the arrangement on the sensor signals or to generate a sensor signal which might be expected from a different arrangement or topology.

The arrangement-related operation may be a crosstalk suppression operation. In this regard, the output sensor signal of the crosstalk suppression operation may correspond to one of the input sensor signals of the crosstalk suppression operation and result from a subtraction from its corresponding input sensor signal of a fraction of another said input sensor signal, that fraction associated with that pair of input sensor signals.

In this way, the effect of mechanical crosstalk may be reduced or suppressed in the output sensor signal.

The crosstalk suppression operation may be configured to generate a plurality of output sensor signals of the crosstalk suppression operation which correspond to respective said input sensor signals of the crosstalk suppression operation. Each said output sensor signal of the crosstalk suppression operation may result from a subtraction from its corresponding input sensor signal of the crosstalk suppression operation of a fraction of a said input sensor signal of the crosstalk suppression operation other than its corresponding input sensor signal, that fraction associated with that pair of input sensor signals.

At least one said output sensor signal of the crosstalk suppression operation may result from a subtraction from its corresponding input sensor signal of respective fractions of respective said input sensor signals of the crosstalk suppression operation other than its corresponding input sensor signal, each respective fraction associated with a pair of those input sensor signals concerned.

Each fraction and its association with input sensor signals of the crosstalk suppression operation may be based on the arrangement of the force sensors in the device. Each fraction may be dependent on a distance, and/or mechanical interaction, between the force sensors from which its associated pair of input sensor signals of the crosstalk suppression operation originate. For each said subtraction of a said fraction of a said input sensor signal of the crosstalk suppression operation, an amount subtracted may be the product of that fraction and that input sensor signal.

Each fraction may have a value between a minimum fraction value, greater than or equal to 0, and a maximum fraction value, less than 1 and larger than the minimum fraction. The minimum fraction value may be 0 and the maximum fraction value may be between 0.2 and 0.6, optionally being 0.3.

The crosstalk suppression operation may be applied in respect of a given output sensor signal of the crosstalk suppression operation dependent on a magnitude of its corresponding input sensor signal exceeding a given threshold. The crosstalk suppression operation may be configured in respect of a given output sensor signal of the crosstalk suppression operation to replace each fraction concerned with a zero-valued fraction (i.e. zero) when a magnitude of its corresponding input sensor signal does not exceed the given threshold.

The controller may be configured to update a said fraction over time dependent on magnitudes or relative magnitudes of its associated pair of input sensor signals, optionally at a rate defined by a rate parameter. This may enable the fraction (and thus the crosstalk suppression operation) to be adaptive so that its performance tends to an optimum or target performance over time.

The updating may be at a rate defined by an above-threshold rate parameter when a magnitude of one or both of the associated pair of input sensor signals is above a threshold value. The updating may be at a rate defined by a below-threshold rate parameter when a magnitude of one or both of the associated pair of input sensor signals is below a threshold value. Such rate parameters may be different from one another.

The updating may be controlled based on an optimization or minimization algorithm. Such an algorithm may be configured to find a minimum of an error function, the error function optionally defining the output signal of the crosstalk suppression operation for the fraction concerned based on its corresponding input sensor signal of the crosstalk suppression operation, that fraction and the other said input sensor signal of the crosstalk suppression operation concerned. The algorithm may be an iterative minimization algorithm such as a gradient descent algorithm.

The controller may be configured to store initial and updated values of the fraction and/or estimate values for the fraction.

The fraction may have a constant or maintained value. That is, it may be desirable to not employ adaptive control of the crosstalk suppression operation in some cases.

The controller may be operable to carry out at least first and second different arrangement-related operations, the first arrangement-related operation being the crosstalk suppression operation and the second arrangement-related operation being a localisation operation. An output sensor signal of the localisation operation may be generated based on a given weighting associated with at least two input sensor signals of the localisation operation derived from the force sensors and defining a location of interest relative to locations of the force sensors so that the output signal of the localisation operation is representative of the location of interest.

As one possibility, the crosstalk suppression operation may be performed before the localisation operation. That is, the input sensor signals of the localisation operation may be output sensor signals of the crosstalk suppression operation where the crosstalk suppression operation is configured to generate a plurality of output sensor signals which correspond to respective input sensor signals of the crosstalk suppression operation.

As another possibility, the localisation operation may be performed before the crosstalk suppression operation. That is, the input sensor signals of the crosstalk suppression operation may be output sensor signals of the localisation operation where the localisation operation is configured to generate a plurality of output sensor signals each based on a given weighting associated with at least two input sensor signals of the localisation operation.

The controller may be configured to carry out a localisation operation without carrying out a crosstalk suppression operation. That is, the arrangement-related operation may be a localisation operation in which the output sensor signal is generated based on a given weighting associated with the at least two said input sensor signals and defining a location of interest relative to locations of the force sensors so that the output signal of the localisation operation is representative of the location of interest, the input sensor signals being input sensor signals of the localisation operation.

The localisation operation may be configured to generate a plurality of output sensor signals, each output sensor signal of the localisation operation being generated based on a given weighting associated with at least two said input sensor signals of the localisation operation and defining a location of interest relative to locations of the force sensors so that the output signal of the localisation operation concerned is representative of the location of interest concerned.

At least two output sensor signals of the localisation operation may be generated based on different given weightings and/or different input sensor signals of the localisation operation so that those output sensor signals are different from one another.

Each said output sensor signal of the localisation operation may result from a weighted combination of the at least two input sensor signals of the localisation operation concerned, the weighted combination weighted according to the given weighting concerned. The weighting may effectively provide location/directional information, so that an output sensor signal of the localisation operation is representative of a force sensed at a given location (which may be different from that of any of the force sensors).

The weighted combination may be a weighted average or a weighted sum. Each output sensor signal of the localisation operation may be representative of a force applied at the location of interest concerned. Each weighted average or weighted sum may comprise a sum of products, the products corresponding respectively to the input sensor signals of that weighted sum, and each product being the product of the input sensor signal of that product and a corresponding weight defined by the weighting concerned.

As one option, the localisation operation may comprise, in association with at least one of its output sensor signals, calculation of a further output sensor signal as a function of a first ratio of the input sensor signals concerned to one another and a second ratio defining the weighting concerned.

As another option, each output sensor signal of the localisation operation may be calculated as a function of a first ratio of magnitudes of the input sensor signals concerned to one another and a second ratio defining the weighting concerned.

The calculation may comprise comparing the first ratio concerned with the second ratio concerned. Each output sensor signal of the localisation operation calculated as a function of the first ratio concerned and the second ratio concerned may be representative of whether a force applied is applied at the location of interest concerned or how close a location at which that force is applied is to the location of interest concerned.

The calculation may comprise determining how close the first ratio concerned is to the second ratio concerned. The first and second ratios may be log ratios (i.e. ratios of log values). The calculation may comprise calculating values constrained between defined upper and lower values (such as 1 and 0) using a Gaussian function whose input parameters comprise the first and second ratios concerned. The Gaussian function may be an unnormalized Gaussian radial basis function.

Each weighting comprises a series of weights corresponding respectively to the input sensor signals concerned of the localisation operation. For each weighting its weights may be fractions which sum to 1 (e.g. 0.3 and 0.7).

Each said weighting may be based on the arrangement of the force sensors in the device and the location of interest concerned. Each said weighting may be dependent on locations of the force sensors in the device and the location of interest concerned.

The controller may be configured to store or access arrangement information defining the arrangement of the force sensors in the device, such as the relative locations of the force sensors. The controller may be configured to carry out the arrangement-related operation based on the arrangement information.

The controller may be configured to calculate each said output sensor signal based on the input sensor signals concerned and the arrangement information using matrix calculations, i.e. calculations operating on matrices. For example, the input sensor signals, output sensor signals, weights and factors may be presented in matrices.

The controller may be configured to determine a user touch event based on a said output sensor signal or based on a combination of two or more said output sensor signals.

According to a second aspect of the present disclosure, there is provided a device, comprising: at least two force sensors in a given arrangement; and the controller of the aforementioned first aspect, wherein the input sensor signals originate from the respective force sensors of the device.

The force sensors may be provided at different locations on the device. Each of the force sensors may comprise one or more of: a capacitive displacement sensor; an inductive force sensor; a strain gauge; a piezoelectric force sensor; a force sensing resistor; a piezoresistive force sensor; a thin film force sensor; and a quantum tunnelling composite-based force sensor.

The device may comprise one or more input/output components, wherein the controller is configured to control operation of at least one of the input/output components based on a said output sensor signal.

The device may be a portable electrical or electronic device such as a portable telephone or computer. Other example types of device are mentioned later.

According to a third aspect of the present disclosure, there is provided a controller for use in a device which comprises at least two force sensors, the controller operable, based on input sensor signals derived from the force sensors, to carry out a crosstalk suppression operation in which an output sensor signal is generated which corresponds to one of the input sensor signals and results from a subtraction from its corresponding input sensor signal of a fraction of another said input sensor signal.

According to a fourth aspect of the present disclosure, there is provided a controller for use in a device which comprises at least two force sensors, the controller operable, based on input sensor signals derived from the force sensors, to carry out a localisation operation in which an output sensor signal is generated based on a given weighting associated with at least two said input sensor signals and defining a location of interest relative to locations of those force sensors so that the output signal is representative of the location of interest.

According to a fifth aspect of the present disclosure, there is provided a controller for use in a device which comprises at least two sensors, the controller operable, based on input sensor signals derived from the sensors, to carry out a localisation operation in which an output sensor signal is generated based on a given weighting associated with at least two said input sensor signals and defining a location of interest relative to locations of those sensors so that the output signal is representative of the location of interest, wherein said output sensor signal is calculated as a function of a first ratio of magnitudes of the input sensor signals concerned to one another and a second ratio defining the weighting concerned, the function optionally configured so that the output sensor signal indicates how close the first ratio is to the second ratio.

According to a sixth aspect of the present disclosure, there is provided a method of controlling a device which comprises at least two force sensors in a given arrangement, the method comprising, based on input sensor signals derived from the force sensors, carrying out an arrangement-related operation in which an output sensor signal is generated based on at least two said input sensor signals and the arrangement of the force sensors in the device so that the output sensor signal is dependent on said arrangement.

According to a seventh aspect of the present disclosure, there is provided a computer program which, when executed on a controller of a device which comprises at least two force sensors in a given arrangement, causes the controller, based on input sensor signals derived from the force sensors, to carry out an arrangement-related operation in which an output sensor signal is generated based on at least two said input sensor signals and the arrangement of the force sensors in the device so that the output sensor signal is dependent on said arrangement.

BRIEF DESCRIPTION OF THE DRAWINGS

Reference will now be made, by way of example only, to the accompanying drawings, of which:

FIGS. 4A, 4B and 4C present graphs showing results obtained in connection with an example crosstalk suppression operation;

FIGS. 5A, 5B and 5C present graphs showing results obtained in connection with an example crosstalk suppression operation; and FIG. 6 presents graphs showing results obtained in connection with example localisation operations.

DETAILED DESCRIPTION

Figure 1:
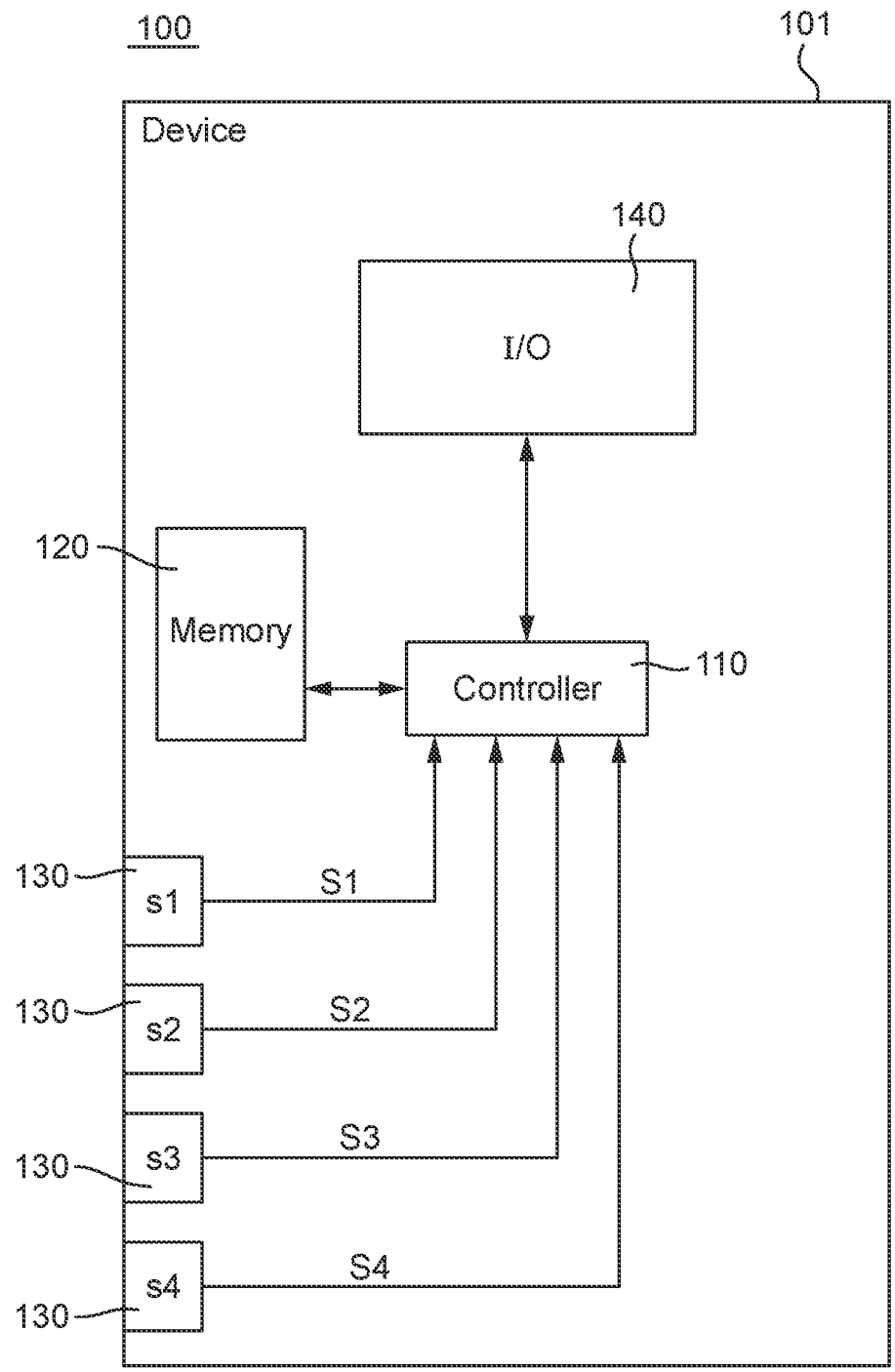
FIG. 1 is a schematic diagram of a device according to an embodiment.

FIG. 1 is a schematic diagram of a device 100 according to an embodiment, for example a mobile or portable electrical or electronic device. Example devices 100 include a portable and/or battery powered host device such as a mobile telephone, a smartphone, an audio player, a video player, a PDA, a mobile computing platform such as a laptop computer or tablet and/or a games device.

As shown in FIG. 1, the device 100 may comprise an enclosure 101, a controller 110, a memory 120, a plurality of force sensors 130, and an input and/or output unit (I/O unit) 140.

The enclosure 101 may comprise any suitable housing, casing, or other enclosure for housing the various components of device 100. Enclosure 101 may be constructed from plastic, metal, and/or any other suitable materials. In addition, enclosure 101 may be adapted (e.g., sized and shaped) such that device 100 is readily transported by a user (i.e. a person).

Controller 110 may be housed within enclosure 101 and may include any system, device, or apparatus configured to control functionality of the device 100, including any or all of the memory 120, the force sensors 130, and the I/O unit 140. Controller 110 may be implemented as digital or analogue circuitry, in hardware or in software running on a processor, or in any combination of these.

Thus controller 110 may include any system, device, or apparatus configured to interpret and/or execute program instructions or code and/or process data, and may include, without limitation a processor, microprocessor, microcontroller, digital signal processor (DSP), application specific integrated circuit (ASIC), FPGA (Field Programmable Gate Array) or any other digital or analogue circuitry configured to interpret and/or execute program instructions and/or process data. Thus the code may comprise program code or microcode or, for example, code for setting up or controlling an ASIC or FPGA. The code may also comprise code for dynamically configuring re-configurable apparatus such as re-programmable logic gate arrays. Similarly, the code may comprise code for a hardware description language such as Verilog™ or VHDL. As the skilled person will appreciate, the code may be distributed between a plurality of coupled components in communication with one another. Where appropriate, such aspects may also be implemented using code running on a field-(re)programmable analogue array or similar device in order to configure analogue hardware. Processor control code for execution by the controller 110, may be provided on a non-volatile carrier medium such as a disk, CD- or DVD-ROM, programmed memory such as read only memory (Firmware), or on a data carrier such as an optical or electrical signal carrier. The controller 110 may be referred to as control circuitry and may be provided as, or as part of, an integrated circuit such as an IC chip.

Memory 120 may be housed within enclosure 101, may be communicatively coupled to controller 110, and may include any system, device, or apparatus configured to retain program instructions and/or data for a period of time (e.g., computer-readable media). In some embodiments, controller 110 interprets and/or executes program instructions and/or processes data stored in memory 120 and/or other computer-readable media accessible to controller 110.

The force sensors 130 may be housed within, be located on or form part of the enclosure 101, and may be communicatively coupled to the controller 110. Each force sensor 130 may include any suitable system, device, or apparatus for sensing a force, a pressure, or a touch (e.g., an interaction with a human finger) and for generating an electrical or electronic signal in response to such force, pressure, or touch. Example force sensors 130 include or comprise capacitive displacement sensors, inductive force sensors, strain gauges, piezoelectric force sensors, force sensing resistors, piezoresistive force sensors, thin film force sensors and quantum tunnelling composite-based force sensors.

In some arrangements, other types of sensor may be employed.

In some arrangements, the electrical or electronic signal generated by a force sensor 130 may be a function of a magnitude of the force, pressure, or touch applied to the force sensor. Such electronic or electrical signal may comprise a general purpose input/output (GPIO) signal associated with an input signal in response to which the controller 110 controls some functionality of the device 100. The term "force" as used herein may refer not only to force, but to physical quantities indicative of force or analogous to force such as, but not limited to, pressure and touch.

The I/O unit 140 may be housed within enclosure 101, may be distributed across the device 100 (i.e. it may represent a plurality of units) and may be communicatively coupled to the controller 110. Although not specifically shown in FIG. 1, the I/O unit 140 may comprise any or all of a microphone, an LRA (or other device capable of outputting a force, such as a vibration), a radio (or other electromagnetic) transmitter/receiver, a speaker, a display screen (optionally a touchscreen), an indicator (such as an LED), a sensor (e.g. accelerometer, temperature sensor, tilt sensor, electronic compass, etc.) and one or more buttons or keys.

As a convenient example to keep in mind, the device 100 may be a haptic-enabled device. As is well known, haptic technology recreates the sense of touch by applying forces, vibrations, or motions to a user. The device 100 for example may be considered a haptic-enabled device (a device enabled with haptic technology) where its force sensors 130 (input transducers) measure forces exerted by the user on a user interface (such as a button or touchscreen on a mobile telephone or tablet computer), and an LRA or other output transducer of the I/O unit 140 applies forces directly or indirectly (e.g. via a touchscreen) to the user, e.g. to give haptic feedback. Some aspects of the present disclosure, for example the controller 110 and/or the force sensors 130, may be arranged as part of a haptic circuit, for instance a haptic circuit which may be provided in the device 100. A circuit or circuitry embodying aspects of the present disclosure (such as the controller 110) may be implemented (at least in part) as an integrated circuit (IC), for example on an IC chip. One or more input or output transducers (such as the force sensors 130 or an LRA) may be connected to the integrated circuit in use.

Of course, this application to haptic technology is just one example application of the device 100 comprising the plurality of force sensors 130. The force sensors 130 may simply serve as generic input transducers to provide input (sensor) signals to control other aspects of the device 100, such as a GUI (graphical user interface) displayed on a touchscreen of the I/O unit 140 or an operational state of the device 100 (such as waking components from a low-power "sleep" state).

The device 100 is shown comprising four force sensors 130, labelled s1, s2, s3 and s4, with their signals labelled S1, S2, S3 and S4, respectively. However, it will be understood that the device 100 generally need only comprise a pair of (i.e. at least two) force sensors 130 in connection with the techniques described herein, for example any pair of the sensors s1 to s4. Example pairs comprise s1 and s2, s1 and s3, s1 and s4, s2 and s4, s2 and s3, and s3 and s4. The four force sensors 130 s1 to s4 are shown for ready understanding of a particular arrangement described later. Of course, the device 100 may comprise more than four force sensors 130, such as additional sensors s5 to s8 arranged in a similar way to sensors s1 to s4 but in another area of the device 100.

Although FIG. 1 is schematic, it will be understood that the sensors s1 to s4 are located so that they can receive force inputs from a user, in particular a user hand, during use of the device 100. A user force input in this context corresponds to a user touching, pushing, pressing, or swiping the device, optionally with one or both of their hands, in the vicinity of one or more of the force sensors 130 so that a force (e.g. a threshold amount of force) may be applied at multiple force sensors at or substantially at the same time (simultaneously or contemporaneously) in some cases. Of course, in some cases the user may apply a user force input at a single force sensor 130. A change in the amount of force applied may be detected, rather than an absolute amount of force detected, for example.

Thus, the force sensors s1 to s4 may be located on the device according to anthropometric measurements of a human hand. For example, where there is only a pair of force sensors 130, they may be provided on the same side (e.g. s1 and s2) of the device 100. It will be understood that the force sensors 130 are provided at different locations on the device, but may be in close proximity to one another.

For example, as suggested schematically in FIG. 1, the force sensors s1 to s4 may be provided in a linear array or strip on one side of the device 100 (another linear array of force sensors s5 to s8 may be provided on the opposite side of the device 100), and potentially in close proximity to one another. Thus, a given user force input (from a touch of the device 100 in the area of the force sensors 130) may result in forces being picked up at a plurality of those sensors, in part due to mechanical interaction (e.g. mechanical connections, such as via the enclosure 101) between the force sensors 130.

In overview, the controller 110 is operable, based on input sensor signals S1 to S4 which originate (stem or are derived or received) from the respective force sensors s1 to s4, to carry out an arrangement-related operation in which an output sensor signal is generated based on at least two said input sensor signals and the arrangement of the force sensors 130 in the device 100.

That is, the output sensor signal will be dependent to an extent on the arrangement of the force sensors 130 in the device 100, and may be considered characterised by or influenced by that arrangement. Such an arrangement may include any of the location of the force sensors 130 in the device 100, the physical or mechanical coupling of them to one another and to the exterior enclosure 101, their orientation relative to one another and the enclosure 101, etc. In this regard, the arrangement of the force sensors 130 in the device 100 will determine or affect (at least to an extent) how a given user force input (applied at a given location) is represented in the input sensor signals. For example, the location of the force sensors 130 in the device 100, including any mechanical interaction between them, will have an effect on the input sensor signals. Thus, information concerning or defining this arrangement may be used to generate an output sensor signal which is dependent on the arrangement. An arrangement-related operation may be considered a device-arrangement operation, or an adjustment operation or a signal conditioning or profiling operation.

One example arrangement-related operation may be referred to as a crosstalk suppression operation. Considering FIG. 1, mechanical interaction between force sensors s1 and s2 will cause mechanical crosstalk between them, so that an intended force applied for example to force sensor s2 will produce an intended input sensor signal S2 but also related (and unintended) components in input sensor signal S1 of force sensor s1. In this regard, such mechanical interaction and associated mechanical crosstalk may be viewed as distorting at least one of the input force sensor signals and it may be desirable to compensate at least to an extent for that distortion.

Figure 2A:
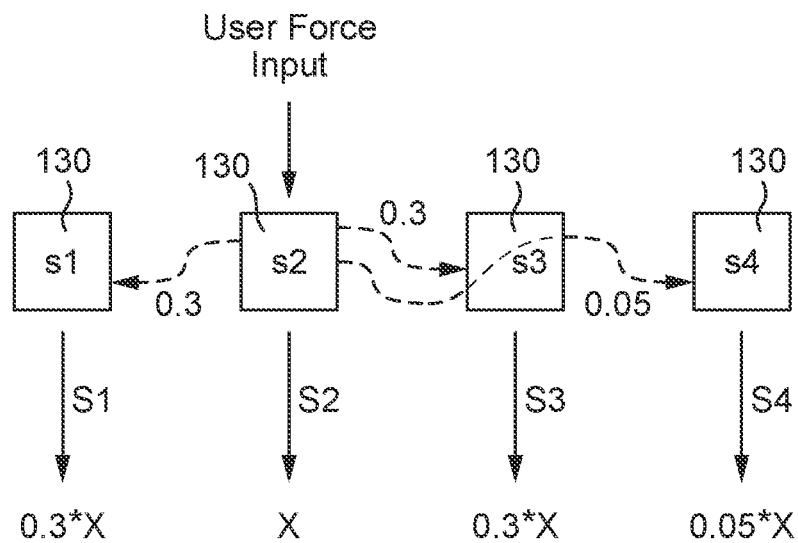
FIG. 2A is a schematic diagram useful for understanding a crosstalk suppression operation.

FIG. 2A is a schematic diagram in which the force sensors s1 to s4 are represented as being located in a linear array running horizontally in the diagram. As such, if a user input force is applied to force sensor s2 as indicated, as well as this user input force being represented by magnitude X in the input sensor signal S2 as intended, mechanical crosstalk between the force sensors 130 causes related components (fractions of the magnitude X) to be represented in the input sensor signals S1, S3 and S4 as indicated.

In the present example, as indicated in FIG. 2A, it is assumed that there is a factor 0.3 mechanical coupling between each of force sensors s1 and s3 and force sensor s2, e.g. because they are located a similar distance either side of force sensor s2. It is assumed that there is a factor 0.05 mechanical coupling between force sensor s4 and force sensor s2, force sensor s4 being located further away from force sensor s2 than force sensor s3. Thus, the input sensor signals S1, S3 and S4 include components 0.3*X, 0.3*X and 0.05*X, respectively, as indicated.

To compensate for the distortion suffered in input sensor signal S1, a compensated input sensor signal S1' could be calculated according to the following equation:

$$S1'=S1-0.3*S2$$

In this way, the effect of the mechanical crosstalk is substantially cancelled in the compensated input sensor signal S1' (which corresponds to the input sensor signal S1) providing that the factor 0.3 is correct, or at least suppressed if the factor 0.3 is not perfect or if simply applying such subtraction does not give perfect cancellation. The cancellation mechanism here is to subtract from the pre-compensated input sensor signal (leakage target) the relevant fraction or proportion or part of the input sensor signal (leakage source) which is causing the distortion. Similar examples could of course be given to produce compensated input sensor signals S3' and S4', corresponding to input sensor signals S3 and S4, respectively.

Another example arrangement-related operation may be referred to as a localisation operation. Considering FIG. 1 again, mechanical interaction between force sensors s1 and s2 (and surrounding locations) may enable their input sensor signals S1 and S2 to be mapped to that of a virtual force sensor 130v (not shown) at a location of interest located somewhere other than at force sensor s1 or s2 (e.g. between force sensors s1 and s2), the force sensors s1 and s2 effectively having picked up a force applied at that location. Similarly, such a mapping may be used to determine whether an applied force (picked up at force sensors s1 and s2) was applied at that location of interest, and e.g. how close to that location of interest the force was applied.

For example, that virtual force sensor 130v may be equated with a virtual button provided at that location of interest, so that a force determined to be applied at that location is assessed (e.g. compared to a threshold) to determine whether a button press of that virtual button should be deemed to have occurred.

Figure 2B:
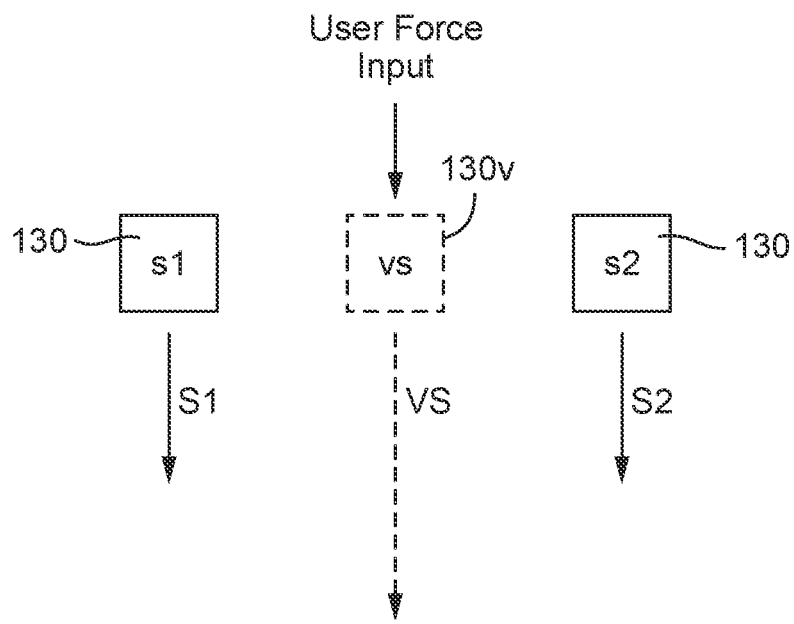
FIG. 2B is a schematic diagram useful for understanding a localisation operation.

FIG. 2B is a schematic diagram in which the force sensors s1 and s2 are represented as being located in a linear array running horizontally in the diagram. As such, if a user input force were applied to the device 100 at a location between the force sensors s1 and s2 as indicated, i.e. at the location of a virtual force sensor 130v labelled vs, that user force input may be picked up at the force sensors s1 and s2 (and expressed in the signals S1 and S2) due to the mechanical link between that location and those force sensors 130. In this regard, such mechanical interaction may be viewed as enabling the input force sensor signals S1 and S2 to be used to assess user force inputs at the virtual force sensor vs, and indeed at other virtual force sensors 130v (locations of interest).

It is assumed in FIG. 2B that the virtual force sensor vs is located (e.g. equidistant) between the force sensors s1 and s2 so that the force sensors s1 and s2 pick up the user force input applied at the location of the virtual (i.e. hypothetical) force sensor vs equally (assuming the mechanical interaction supports this). Thus, a virtual input sensor signal VS (as an output sensor signal of the operation) corresponding to the virtual force sensor vs may be obtained by applying equal factors or weights to the input sensor signals S1 and S2, such as according to the following equation:

$$VS=0.5*S1+0.5*S2$$

Of course, the virtual force sensor vs is not real, and thus could be defined as located between the force sensors s1 and s2 (e.g. closer to force sensor s1 than s2) so that the virtual input sensor signal VS has unequal contributions from the forces picked up at the force sensors s1 and s2. In such a case, the virtual input sensor signal VS (as an output sensor signal of the operation) corresponding to the virtual force sensor vs may be obtained by applying unequal weights to the input sensor signals S1 and S2, such as according to the following equation:

$$VS=0.7*S1+0.3*S2$$

For simplicity, it may be helpful when generating a virtual input sensor signal VS by applying factors to a plurality of input sensor signals (i.e. two or more) to express those weights such that they sum to 1 (e.g. 0.5+0.5=1, and 0.7+0.3=1) or as percentages (e.g. 50%/50%, or 70%/30%).

These possible arrangement-related operations are dependent at least to an extent on the arrangement of the force sensors 130 in the device 100, and relate in particular to how the input sensor signals are handled in the controller 110 based on that arrangement. The skilled person will accordingly recognise that aspects of the arrangement-related operations disclosed herein (and associated methods) may be embodied within the controller 110 itself based on the input sensor signals it receives. As such, the controller 110 itself and the methods it carries out may embody the present invention.

FIGS. 3A to 3D are schematic diagrams useful for understanding that the crosstalk suppression CS and localisation L operations may be employed alone or in combination (e.g. in series). In each of FIGS. 3A to 3D, the functionality may be considered embodied in the controller 110.

Figure 3A:
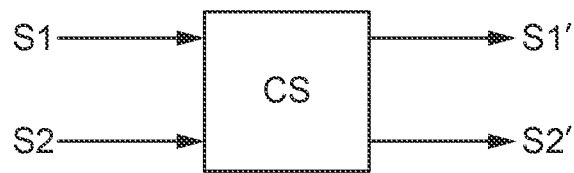
FIGS. 3A to 3D are schematic diagrams useful for understanding that the crosstalk suppression and localisation operations may be employed alone or in combination.

In FIG. 3A, the CS (crosstalk suppression) operation is shown operating on the input sensor signals S1 and S2 to produce corresponding compensated input sensor signals S1' and S2' (as output sensor signals of the operation). The CS operation could for example produce only one of the compensated input sensor signals S1' and S2'. As another example, the CS operation could operate on the input sensor signals S1 to S4 to produce one or more of corresponding compensated input sensor signals S1' to S4'. The or each compensated input sensor signal may be considered an output sensor signal of the CS operation.

The input sensor signals and the compensated input sensor signals may be considered generally as input sensor signals which originate from respective force sensors 130, i.e. are based on or result from the forces detected at those force sensors 130. For example, the signals S1 and S1' may be considered to originate from the force sensor s1, the signals S2 and S2' from the force sensor s2, and so on and so forth.

Figure 3B:
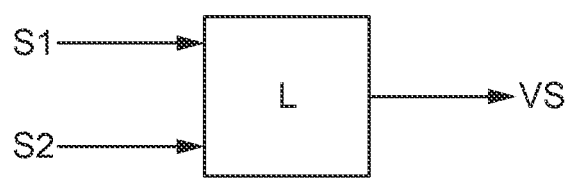

In FIG. 3B, the L (localisation) operation is shown operating on the input sensor signals S1 and S2 to produce a corresponding virtual input sensor signal VS (as an output sensor signal of the operation). The L operation could for example produce only one virtual input sensor signal VS as shown, or a plurality of (different) virtual input sensor signals VS (representing signals originating at differently located and/or configured virtual force sensors). As an example, the L operation could operate on the input sensor signals S1 to S4 (or any group of them) to produce virtual input sensor signal VS (or a plurality of different virtual input sensor signals such as VS1 and VS2). The or each virtual input sensor signal may be considered an output sensor signal of the L operation.

Figure 3C:
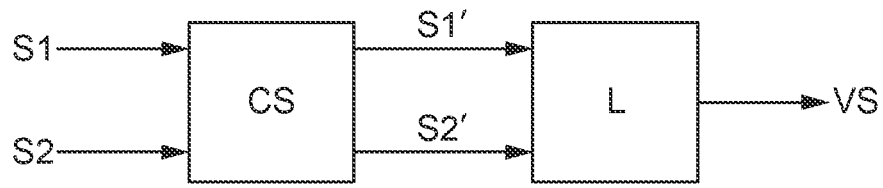

In FIG. 3C, the CS (crosstalk suppression) operation is shown followed by the L (localisation) operation. As in FIG. 3A, the CS operation is shown operating on the input sensor signals S1 and S2 to produce corresponding compensated input sensor signals S1' and S2'. These compensated input sensor signals S1' and S2' are output sensor signals of the CS operation and input sensors signals of the L operation. The L operation is shown operating on its input signals S1' and S2' to produce a corresponding virtual input sensor signal VS. The virtual input sensor signal VS may be considered an output sensor signal of the L operation and of the combined CS and L operations.

Figure 3D:
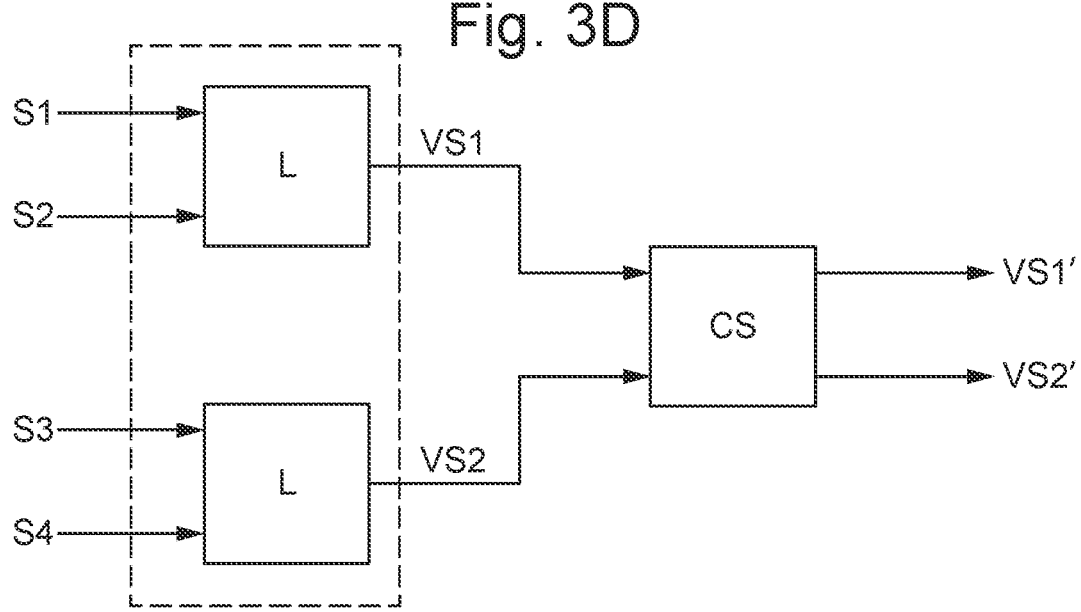

In FIG. 3D, the L (localisation) operation is shown followed by the CS (crosstalk suppression) operation, indicating the L operation as made up of a plurality of L operations for ease of understanding. As in FIG. 3B, a first L operation is shown operating on the input sensor signals S1 and S2 to produce a virtual input sensor signal VS1 (as an output sensor signal of the operation). A second L operation is shown operating on the input sensor signals S3 and S4 to produce a virtual input sensor signal VS2 (as an output sensor signal of the operation). These virtual input sensor signals VS1 and VS2 are output sensor signals of the overall L operation and input sensors signals of the CS operation. The CS operation is shown operating on its input sensor signals VS1 and VS2 to produce corresponding compensated virtual input sensor signals VS1' and VS2' (as output sensor signals of the CS operation). The compensated virtual input sensor signals VS1' and VS2' may be considered output sensor signals of the CS operation and of the combined L and CS operations.

Thus, it will be appreciated that the input sensor signals of the CS operation may have a one-to-one relationship with the force sensors 130 (see FIG. 3A) or a one-to-many relationship with the force sensors 130 (see FIG. 3D). Where there are many force sensors 130 and fewer virtual buttons (and hence virtual input sensor signals), it may be advantageous to perform the L (localisation) operation followed by the CS (crosstalk suppression) operation as in Figure D to reduce the number of calculations required in the CS operation (since it is performed on fewer signals).

The input sensor signals shown in FIGS. 3A to 3C may be representative of internal signals of the controller 110, for example digital input sensor signals generated following analogue-to-digital conversion of corresponding analogue input sensor signals received (directly or indirectly) from the force sensors 130. The analogue-to-digital conversion could be carried out by corresponding analogue-to-digital converters (ADCs, not shown), which could be provided within the force sensors 130, within the controller 110, or between the force sensors 130 and the controller 110. The force sensors 130 could be digital force sensors which output digital signals. This extends generally to the input sensor signals described herein, and thus the output sensor signals similarly may be digital signals. It will be appreciated that the sensor signals may be subject to conversion (e.g. analogue-to-digital), normalisation, filtering (e.g. high-pass, low-pass or band-pass frequency filtering), averaging (e.g. finding a running average) or other signal conditioning operations.

The crosstalk suppression and localisation operations will now be considered in more detail in turn.

Starting with the crosstalk suppression operation, and by way of recap, the device 100 may be considered to comprise at least two force sensors 130, for example s1 and s2 in FIG. 1.

Looking for example at FIGS. 2A and 3A together, in particular the example calculation of S1' in FIG. 2A, the controller 110 is operable, based on input sensor signals S1 and S2 which originate from the respective force sensors s1 and s2, to carry out a crosstalk suppression operation in which an output sensor signal S1' (as an example one of S1' and S2') is generated which corresponds to one of the input sensor signals (i.e. S1) and results from a subtraction from its corresponding input sensor signal (i.e. S1) of a fraction (e.g. 0.3) of another of the input sensor signals (i.e. S2).

In this context, the fraction may be considered associated with the pair of input sensor signals concerned. In the example of FIG. 2A, the fraction 0.3 may be considered a correlation (crosstalk) factor $c_{21}$ indicating the crosstalk or signal leakage from force sensor s2 to s1. It may be expected that a correlation factor $c_{12}$ indicating the crosstalk or signal leakage from force sensor s1 to s2 is also 0.3, due to symmetry. Thus, both of the following equations may be appropriate:

$$S1'=S1-0.3*S2$$

$$S2'=S2-0.3*S1$$

It is recalled that the input sensor signals of the crosstalk suppression operation may be output signals of the localisation operation, and this will be kept in mind although for simplicity the signal notation S1, S2 (relating to the force sensors s1, s2) will be used here.

Using x for input sensor signals and y for output sensor signals for a given operation, and assuming that the input and output sensor signals are digital signals comprising a series of samples where n is the sample number, the above equation for S2' may be presented in the form:

$$y2(n)=x2(n)c12*x1(n)$$

Here, y2(n) corresponds to S2', x2(n) corresponds to S2 and x1(n) corresponds to S1. Further, y2 and x2 may be referred to as channel 2 signals since they originate from sensor s2, and x1 may similarly be referred to as a channel 1 signal since it originates from sensor s1. Again, recall that the channels may relate to virtual buttons rather than to individual sensors.

Here, c12 is the correlation factor defining the crosstalk from channel 1 to channel 2, and is 0.3 in the example above. Similarly, c21 would be the correlation factor defining the crosstalk from channel 2 to channel 1. This notation and terminology will be carried forwards.

A given correlation factor such as c12 may differ from device to device, dependent on the arrangement of the force sensors 130. Even in devices 100 apparently of the same type, tolerances in manufacture may lead to differences in correlation factor between those devices 100. Indeed, it will become apparent that a given correlation factor such as c12 may vary over time in a given device 100, for example due to aging or temperature changes or in an iteration process towards an improved value.

In the context of the crosstalk suppression operation generating a plurality of output sensor signals which correspond to respective input sensor signals, those output sensor signals could thus be represented in the context of FIG. 3A as:

$$y1(n)=x1(n)-c21*x2(n)$$

$$y2(n)=x2(n)-c12*x1(n)$$

Each output sensor signal results from a subtraction from its corresponding input sensor signal of a fraction (determined by the correlation factor concerned) of an input sensor signal other than its corresponding input sensor signal, that fraction associated with that pair of input sensor signals.

More generally, there could be more than two input sensor signals contributing to a single output sensor signal. For example, where there are three channels 1 to 3 (corresponding to force sensors s1 to s3, respectively), channel 2 may suffer crosstalk from channels 1 and 3 and the crosstalk suppression operation may serve to address this with the output sensor signal for channel 2 represented as:

$$y2(n)=x2(n)-[c12*x1(n)+c32*x3(n)]$$

Thus, at least one output sensor signal may result from a subtraction from its corresponding input sensor signal of respective fractions (determined by respective correlation factors) of respective input sensor signals other than its corresponding input sensor signal, each respective fraction associated with a pair of input sensor signals concerned.

The general idea is thus to suppress the contribution (crosstalk) from one force sensor 130 to another (e.g. adjacent) force sensor 130, or from one virtual button to another. This may improve the quality or accuracy of the output sensor signals (i.e. in which the crosstalk has been suppressed) as compared to their corresponding input sensor signals (i.e. in which the crosstalk has not yet been suppressed), and in some cases avoid false triggering of an action or event or state under control by the controller 110.

Generalising the crosstalk suppression operation to be used in a device 100 having N force sensors 130 producing N respective channels, the aim of the crosstalk suppression operation could be summarised as being to obtain the vector y(n)=[y1(n), y2(n) ... yN(n)] which has crosstalk between (e.g. adjacent) force sensors suppressed given the input sensor signals x(n)=[x1(n), x2(n) ... xN(n)] in an N-channel configuration.

As above, the correlation factors (fractions) and their association with input sensor signals are based on the arrangement of the force sensors 130 in the device 100. For example, each correlation factor may be dependent on a distance, and/or mechanical interaction, between the force sensors 130 from which its associated pair of input sensor signals originate (or between the virtual buttons from which its associated pair of input sensor signals originate).

In practice, the correlation factors may have values between a minimum fraction value, greater than or equal to 0, and a maximum fraction value, less than or equal to 1 and larger than the minimum fraction value. The minimum fraction value may be 0 (indicating no crosstalk) and the maximum fraction value may be between 0.2 and 0.6 (indicating the maximum leakage expected, i.e. percentage of signal transferred to adjacent force sensors). In practical embodiments, a suitable maximum fraction value may be 0.3. That is, the leakage will likely be limited in practice.

It was mentioned earlier that it may be necessary to update or change the correlation factors over time (as an alternative to maintaining fixed, predetermined or set, values), e.g. to take account of changing conditions (such as aging or temperature changes) or to iterate towards a value better or even best representative of the true crosstalk.

This will now be considered further taking the channel 2 output signal y2(n) as an example, where (as mentioned earlier):

$$y2(n)=x2(n)-c12*x1(n)$$

One approach considered is to use running values of the input and output sensor signals to determine the correlation factor c12, based on the following minimization:

$$\operatorname*{argmin}_{c12} E[y2(n)^2]$$

where E[ ] is the expected value and the minimization finds the value of the argument c12 that minimizes the objective function E[y2(n)²].

Applying gradient descent to minimize to find this minimum leads to the following correlation factor update expression:

$$c12(n+1) = c12(n) - \mu \frac{\partial E\{y2(n)^2\}}{\partial c12} = c12(n) + 2\mu \cdot y2(n) \cdot x1(n)$$

Here the symbol μ (mu) defines a learning rate to adapt the correlation factor c12. This adaptation of the correlation factor c12 may for example be applied only where a magnitude of the input sensor signal x2(n) is above a threshold TH, so that it is likely that a user force input was intended in respect of the signal x2 (e.g. to avoid updating the correlation factor c12 based on noise).

The updating is thus controlled here based on an optimization (minimization) algorithm configured to find a minimum of an error function. Here $y2(n)^2$ may be considered an error function for example assuming that a user force input was applied only at sensor s1. The example optimization algorithm provided here is an iterative minimization algorithm, in particular a gradient descent algorithm.

A constraint may be applied to this correlation factor c12 such that it doesn't exceed a given maximum fractional value (maxCorr) as mentioned earlier, such as 0.3, because it is not expected that all the energy would leak from one force sensor to another. A further constraint may be applied to such that it doesn't fall below a given minimum fractional value, such as 0 so that it does not become negative. Such constraints may be applied to provide update expressions as follows:

$$c12(n+1) = \min(\text{maxCorr}, c12(n+1))$$

$$c12(n+1) = \max(0, c12(n+1))$$

Generalizing the previous example based on y2(n) to an N-channel configuration leads to the following set of equations expressed using matrices:

$$\underline{y(n)}_{1 \times N} = \underline{x(n)}_{1 \times N} - \vec{1} \cdot \left( \underline{C(n+1)}_{N \times N} \circ \underline{X_M}_{N \times N} \right) \quad (1)$$

$$\vec{1} = \underbrace{(1, 1, \ldots, 1)}_{1 \times N}$$

$$X_M = \underline{M}_{N \times N} \circ \left( x^T(n) \times \vec{1} \right)$$

$$C(n+1) = C(n) + 2\mu \left( X_M^T - C(n) \circ X_M \right) \varnothing \left( x^T(n) \cdot \vec{1} + \epsilon \right) \quad (2)$$

$$C(n+1) = \max(0, \min(\text{maxCorr}, C(n+1)))$$

where x, y and 1 are 1×N matrices, and C, X and M are N×N matrices, and ∘ and ø are the Hadamard (element-wise) product and division. The matrix C is a correlation matrix containing the correlation factors for corresponding pairs of channels. The matrix M is a correlation mask matrix containing either 0 or 1 to indicate pairs of channels where crosstalk is likely to happen. For example, the element m12 in the matrix M signifies whether it is desired to estimate the crosstalk from channel 1 to channel 2 in an adaptive manner. The symbol epsilon is a bias value.

As with the example for y2(n) above, the equation (2) might only be applied on those channels where the input sensor signal from which crosstalk is to be removed is greater than a threshold TH. For example, it could be that no crosstalk suppression is applied on those channels where the input sensor signal from which crosstalk is to be removed is less than the threshold TH.

As another option, when the input sensor signal from which crosstalk is to be removed is below this threshold TH then the equation (2) could be replaced by:

$$C(n+1) = C(n) - \mu_d C(n) = C(n) \cdot (1 - \mu_d) \quad (3)$$

wherein symbol $\mu_d$ defines another learning rate (or, in this case, a decay rate) to adapt the correlation factors of the matrix C.

Combining the two situations (above and below the threshold TH), leads to the update expression:

$$C(n+1) = W \circ (C(n) + 2\mu(X_M^T - C(n) \circ X_M) \varnothing (x^T(n) \cdot \vec{1} + \epsilon)) + 1 - W) \circ (C(n) \cdot (1 - \mu_d)) \quad (4)$$

where the N×N matrix W has the nth row equal to 1 if the amplitude of x(n)>TH and 0 otherwise.

Accordingly, each fraction (correlation factor) may be updated over time dependent on magnitudes or relative magnitudes of its associated pair of input sensor signals. For example, each fraction may be adapted at a first rate when a magnitude of one or both of its associated pair of input sensor signals is above a threshold value TH. It may also be that crosstalk suppression is applied only when a magnitude of one or both of an associated pair of input sensor signals is above a threshold value. As another example, each fraction may be adapted over time (e.g. decreased down to the minimum fractional value) at a second rate when a magnitude of one or both of its associated pair of input sensor signals is below the threshold value TH. It will be appreciated that the controller 110 may be configured to store initial and updated values of each said fraction, for example in internal registers or in the memory 120.

It will be appreciated that the above equations could be implemented in software, for example in an iterative manner (e.g. channel-by-channel) to avoid the complexity of handling matrices. The equations may be applied in this way individually for each sample of each channel, i.e. for each value of n, first process x1(n), then x2(n) and so on and so forth. One possible implementation may omit applying the learning rate $\mu_d$ to adapt the correlation factors when the input sensor signals are below the threshold value TH.

FIGS. 4A, 4B and 4C present graphs showing results obtained using a setup comprising 4 force sensors s1 to s4 (Channels 1 to 4), i.e. N=4.

It is also assumed that the interaction between the force sensors is such as to have a corresponding mask matrix M:

$$M = \begin{bmatrix} 0 & 1 & 0 & 0 \\ 1 & 0 & 0 & 0 \\ 0 & 0 & 0 & 1 \\ 0 & 0 & 1 & 0 \end{bmatrix}$$

Thus, the relevant correlation factors are c21, c12, c43 and c34.

The input sensor signals correspond to an example where firstly a single press is carried out on Channel 2 (from sample 1800 to 3500), secondly a single press is carried out on Channel 1 AND Channel 2 (from sample 5000 to 7520), and thirdly a single press is carried out on Channel 1 AND Channel 2 AND Channel 3 (from sample 9400 to 13000).

For FIG. 4A, the correlation factors are fixed at 0.3. For FIG. 4B, the correlation factors are updated according to a software implementation of the equations above (i.e. allowing updating—at different rates—when the input sensor signals are above and below the threshold value TH). For FIG. 4C, the correlation factors are updated according to a software implementation of the equations above but only allowing updating when the input sensor signals are above the threshold value TH.

In each case, the uppermost plot shows the output sensor signals y1(n) to y4(n) as if no crosstalk suppression (AdSS) is performed so that the output sensor signals y1(n) to y4(n) are the same as the input sensor signals x1(n) to x4(n), respectively. The plot shows the output sensor signals y1(n) to y4(n) as if crosstalk suppression (AdSS) is performed.

The lowermost plot shows the values of the correlation factors (elements) used in connection with the middle plot.

Figure 5B:
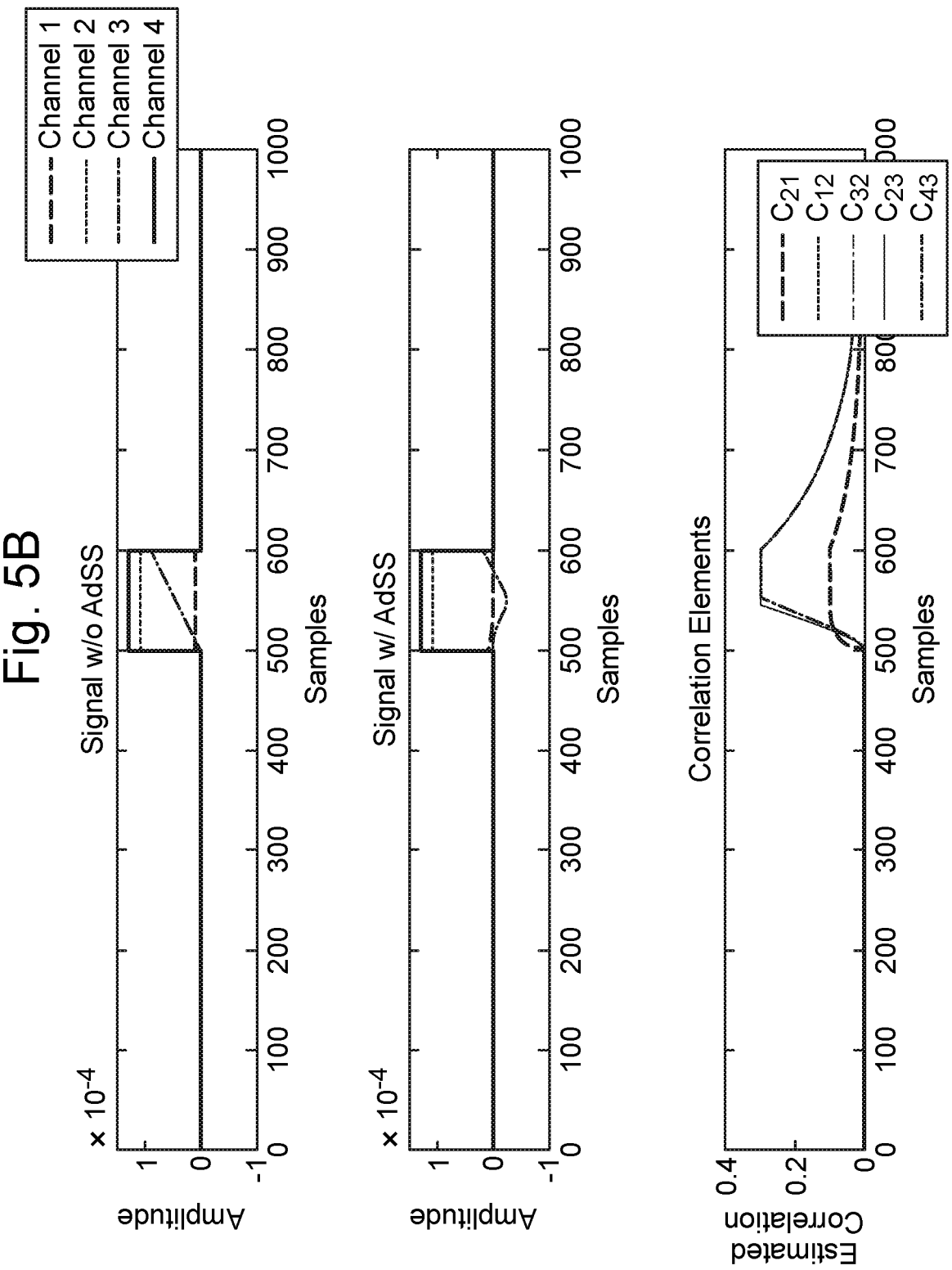

FIGS. 5A, 5B and 5C present graphs showing results obtained using a setup comprising 4 force sensors s1 to s4 (Channels 1 to 4), i.e. N=4, similarly to for FIGS. 4A to 4C. Here, it is assumed that the force sensors 130 are in the same strip or linear array, and that there is leakage (crosstalk) between adjacent force sensors such as to have a corresponding mask matrix M:

$$M = \begin{bmatrix} 0 & 1 & 0 & 0 \\ 1 & 0 & 1 & 0 \\ 0 & 1 & 0 & 1 \\ 0 & 0 & 1 & 0 \end{bmatrix}$$

Thus, the relevant correlation factors are thus c21, c12, c32, c23, c43 and c34.

For FIGS. 5A to 5C the force is artificially generated on Channels 4 and 2 alone. Therefore in Channels 1 and 3 only leakage from Channels 2 and 4 is experienced, and this is simulated by creating from sample 500 to 600 the Channel 1 input sensor signal as being equal to 0.1 times the Channel 2 input sensor signal, and the Channel 3 input sensor signal as an increasing signal ramping up from 0 to approximately 80% of the amplitude in the Channel 2 input sensor signal.

For FIG. 5A, the correlation factors are fixed at 0.3 For FIG. 5B, the correlation factors are updated according to a software implementation of the equations above (i.e. allowing updating—at different rates—when the input sensor signals are above and below the threshold value TH). For FIG. 5C, the correlation factors are updated according to a software implementation of the equations above but only allowing updating when the input sensor signals are above the threshold value TH.

In each case, the uppermost plot shows the output sensor signals y1(n) to y4(n) as if no crosstalk suppression (AdSS) is performed so that the output sensor signals y1(n) to y4(n) are the same as the input sensor signals x1(n) to x4(n), respectively. The middle plot shows the output sensor signals y1(n) to y4(n) as if crosstalk suppression (AdSS) is performed. The lowermost plot shows the values of the correlation factors (elements) used in connection with the middle plot.

In each of FIGS. 4A to 4C and FIGS. 5A to 5C, a comparison between the upper and middle plots shows the crosstalk suppression achieved. Also, in FIGS. 4B, 4C, 5B and 5C the effect of adaptively updating the correlation factors can be seen.

Moving now to the localisation operation, and by way of recap, the device 100 may be considered to comprise at least two force sensors 130, for example s1 and s2 in FIG. 1. Looking for example at FIGS. 2B and 3B together, in particular the example calculation of the virtual input sensor signal VS in FIG. 2B, the controller 110 is operable, based on input sensor signals S1 and S2 (or S1' and S2' in FIG. 3C) which originate from the respective force sensors s1 and s2, to carry out a localisation operation in which an output sensor signal VS is generated based on a given weighting associated with at least two said input sensor signals. The signals S1 and S2 (FIG. 3B), and S1' and S2' (FIG. 3C), may be referred to as input sensor signals of the localisation operation.

Here the weighting effectively defines a location of interest (i.e. the location of the virtual sensor vs) relative to locations of the force sensors s1 and s2 so that the output signal of the localisation operation is representative of the location of interest. It will become apparent that the output signal of the localisation operation may be representative of a force applied at the location of interest, i.e. may correspond to the virtual input sensor signal VS in FIG. 2B. Another possibility, described later, is that the (or another) output signal of the localisation operation is representative of whether a force applied is applied at the location of interest or how close a location at which that force is applied is to the location of interest. Of course, one or both of these types of output sensor signal may be generated by the localisation operation, and the controller 110 may be controlled based on or both of them. For example, it may be determined whether a virtual button (located at the location of interest, i.e. the location of the virtual force sensor) has been pressed or touched (sufficiently to be determined a "touch event", e.g. based on one or more thresholds). The following disclosure will be understood accordingly.

As in FIG. 2B, a virtual input sensor signal VS (as an output sensor signal of the localisation operation) may be obtained by applying factors or weights to the input sensor signals S1 and S2, such as according to the following equation:

$$VS = 0.5 * S1 + 0.5 * S2$$

Such a virtual input sensor signal VS may correspond to a virtual force sensor vs (location of interest) located equidistant between the force sensors s1 and s2, or at least so that the user force input concerned has equal effect at the force sensors s1 and s2, hence the applied weights 0.5 and 0.5 as above. The given weighting here may be expressed as 0.5:0.5 or 50%:50% for example, whereby the weights are effectively fractions which sum to 1.

Of course, the localisation operation may be configured to generate a plurality of output sensor signals, each output sensor signal being generated based on a given weighting associated with at least two input sensor signals of the localisation operation. For example, a first virtual input sensor signal VS1 and a second virtual input sensor signal VS2 could be generated according to the following equations:

$$VS1 = 0.5 * S1 + 0.5 * S2$$

$$VS2 = 0.7 * S1 + 0.3 * S2$$

Such virtual input sensor signals VS1 and VS2 may correspond to virtual force sensors vs1 and vs2 (locations of interest) located in different places relative to force sensors s1 and s2, as indicated by the different weightings 0.5:0.5 and 0.7:0.3.

As another example, there may be more than two force sensors 130 such as force sensors s1 to s3 or s1 to s4 as in FIG. 1, with corresponding input sensor signals. The localisation operation may be configured to generate a plurality of output sensor signals, each output sensor signal being generated based on a given weighting associated with at least two input sensor signals of the localisation operation. For example, first to third virtual input sensor signals VS1, VS2, VS3 could be generated according to the following equations:

$$VS1 = 0.5 * S1 + 0.5 * S2$$

$$VS2 = 0.7 * S2 + 0.3 * S3$$

$$VS3 = 0.5 * S2 + 0.3 * S3$$

Such virtual input sensor signals (as output sensor signals of the operation) may correspond to virtual force sensors vs1, vs2 and vs3 (locations of interest) located in different places, as indicated by the different weightings and/or different input sensor signals employed.

As another example, the localisation operation may be configured to generate at least one output sensor signal based on a given weighting associated with three or more input sensor signals of the localisation operation. For example, a fourth virtual input sensor signal VS4 could be generated according to the following equation:

$$VS4=0.5*S1+0.3*S2+0.2*S3$$

Such a virtual input sensor signal VS4 may correspond to a virtual force sensor vs4 (location of interest) located relative to the force sensors s1, s2 and s3. A ratio defining the ratio here may be expressed e.g. as 0.5:0.3:0.2.

The above virtual input sensor signals (output sensor signals of the localisation operation) result from a weighted combination of the at least two input sensor signals of the localisation operation concerned, the weighted combination weighted according to the given weighting concerned. The weighted combination may be considered a weighted average or a weighted sum (having the weights as fractions which sum to 1 enables a weighted average to be conveniently expressed as a weighted sum). As can be seen above, each weighted average or weighted sum comprises a sum of products, the products corresponding respectively to the input sensor signals of that sum. Each product is the product of the input sensor signal of that product and a corresponding weight defined by the weighting concerned.

Using x for input sensor signals and y for output sensor signals for a given operation (as earlier), and assuming that the input and output sensor signals are digital signals comprising a series of samples where n is the sample number, the above equation for VS1 may be presented in the form:

$$y1(n)=w11*x1(n)+w21*x2(n)$$

Here, y1(n) corresponds to VS1, x1(n) corresponds to S1, and x2(n) corresponds to S2. Further, x1 and x2 may be referred to as channel 1 and 2 signals since they originate from force sensors s1 and s2, respectively. Here, w11 is the weight defining the contribution from channel 1 to output signal 1, and is 0.5 in the VS1 example above. Similarly, w21 is the weight defining the contribution from channel 2 to output signal 1, and is also 0.5 in the VS1 example above. This notation and terminology will be carried forwards.

Generalizing the previous example based on y1(n) to an N-channel configuration leads to the following set of equations expressed using matrices:

$$y(n)=x(n) \times S2B$$

where the matrix y(n) is a 1×M matrix and corresponds to M output sensor signals, matrix x(n) is a 1×N matrix and corresponds to N input sensor signals or channels, and matrix S2B is a N×M matrix and provides the weighting mapping from the N input sensor signals to the M output sensor signals. These matrices may thus be defined:

$$y(n) = [\, y1(n) \ \ldots \ yM(n) \,]$$

$$x(n) = [\, x1(n) \ \ldots \ xN(n) \,]$$

$$S2B = \begin{bmatrix} w11 & \ldots & w1M \\ \vdots & \ddots & \vdots \\ wN1 & \ldots & wNM \end{bmatrix}$$

In an example mapping of 4 force sensors (N=4) to 2 virtual force sensors (M=2), the mapping matrix S2B may look like:

$$S2B = \begin{bmatrix} 0.5 & 0 \\ 0.5 & 0 \\ 0 & 0.5 \\ 0 & 0.5 \end{bmatrix}$$

It will be recalled that the virtual force sensors (locations of interest) may be equated with virtual buttons, hence S2B may be interpreted as "Sensor-to-Button". Here, absent uneven mechanical interactions between the force sensors s1 to s4, the weighting appears to locate the first virtual button halfway between force sensors s1 and s2, and the second virtual button halfway between force sensors s3 and s4.

The position of the virtual buttons (virtual force sensors) can accordingly be readily controlled by controlling the weightings, as expressed in the S2B matrix. A weighting applied in the weighted average or sum used to calculate the output sensor signals y(n) for a given virtual button can be controlled to steer that virtual button (location of interest) closer to the location of a given (actual) force sensor 130 by increasing the corresponding weight applied to its input sensor signal (assuming for example that the total of the weights in that weighting remains the same). For example, the following S2B matrix, as compared to the previous one, would steer the location of the first virtual button (location of interest) closer to the force sensor s1 than force sensor s2.

$$S2B = \begin{bmatrix} 0.7 & 0 \\ 0.3 & 0 \\ 0 & 0.5 \\ 0 & 0.5 \end{bmatrix}$$

As mentioned earlier, an alternative or additional type of output sensor signal of the localisation operation may be representative of whether a force applied is applied at the location of interest concerned or how close a location at which that force is applied is to the location of interest concerned. Such an output sensor signal may be referred to as a confidence-measure output sensor signal, whereas the output sensor signals of the localisation operation described thus far (representative of a force applied at the location of interest concerned) may be considered weighted-combination output sensor signals.

Such a confidence-measure output sensor signal (or simply, confidence measure) may also be based on a given weighting associated with at least two said input sensor signals, similarly to the weighted-combination output sensor signals. However, a confidence-measure output sensor signal may more readily provide an indication of how close (in terms of location) a given user force input is to the maximum sensitivity (location) mapped by the weighting concerned.

Such a confidence-measure output sensor signal may be calculated as function of a first ratio of magnitudes of the input sensor signals concerned to one another and a second ratio defining the weighting concerned. For example, for a given virtual force sensor or virtual button (defined by a weighting and associated input sensor signals), the first and second ratios concerned may be compared with one another to generate the confidence-measure output sensor signal. The confidence-measure output sensor signal may then indicate how close the first and second ratios concerned are to one another.

In one possible implementation, the first and second ratios may be log ratios. Further, the calculation of the confidence-measure output sensor signal may comprise calculating values constrained between defined upper and lower values (such as 1 and 0) using a Gaussian function whose input parameters comprise the first and second ratios concerned.

An example will now be considered in which the Gaussian function is an unnormalized Gaussian radial basis function. The example comprises two main steps, and will consider the following example weight mapping matrix S2B between input sensor signals x1(n) to x4(n) and output sensor signals y1(n) and y2(n) (generated by weighted averages or sums) as described earlier, i.e. where two input sensor signals are used to generate one output sensor signal.

$$S2B = \begin{bmatrix} 0.5 & 0 \\ 0.5 & 0 \\ 0 & 0.5 \\ 0 & 0.5 \end{bmatrix}$$

In a first step, a log ratio y(n) is calculated as follows:

$$\gamma(n) = \log 10\left(\max\left(\frac{s_1(n)}{s_2(n) + eps}, 0\right)\right)$$

where s1(n) and s2(n) are the first and second source signals for the mapping concerned. In the present mapping, for y1(n), s1(n)=x1(n) and s2(n)=x2(n), and for y2(n), s1(n)=x3(n) and s2(n)=x4(n). The parameter eps (epsilon) is a bias value.

In a second step, the log ratio α(n) is mapped to a constrained (confidence) value from 0 to 1 using an unnormalized Gaussian radial basis function:

$$\alpha(n) = \exp\left(-\frac{(\gamma(n) - \mu)^2}{2 \cdot \sigma^2}\right)$$

where μ and σ are the mean and standard variation of the unnormalized Gaussian radial basis function. The parameter μ may be a user defined parameter. The parameter σ however is derived from the active rows of the S2B matrix (corresponding to the input sensor signals concerned) for a given column (corresponding to the output sensor signal concerned). For example, in the present S2B matrix example:

For y1(n):

μ=log 10(S2B(1, 1)/S2B(2, 1))=log 10(0.5/0.5)=0

For y2(n):

μ=log 10(S2B(3, 2)/S2B(4, 2))=log 10(0.5/0.5)=0

Using the log ratio instead of a simple ratio helps to enforce symmetry around the maximum sensitivity (location) of the weighting mapping, i.e. so the proportions at each side of this point are mapped to the same confidence value.

FIG. 6 presents graphs showing results obtained from an example where 500 ms ($f_s$=1 kHz) of data was recorded from two force sensors. The resultant input sensor signals are shown on the top plot. Then, four different mappings are applied and the corresponding output sensor signals (resulting from a weighted sum or average) are shown in the middle plot. The bottom plot shows the corresponding confidence-measure output sensor signals for the same mappings as applied for the middle plot. The confidence-measure output sensor signals, exhibiting the characteristic unnormalized Gaussian radial basis function shape, look to be a good measure to indicate the area where the user input force is being applied and therefore enabling potentially a more refined force localisation.

Of course, a combination (or either) of the signals of the middle and bottom plots may be used to control the controller 110 as mentioned earlier, e.g. to determine whether a touch event has occurred. It will be appreciated that either of both of the weighted average/sum output sensor signals and the confidence-measure output sensor signals could be generated, depending on the application.

It will be appreciated that the above arrangement-related operations are example operations which are dependent to an extent on the arrangement of the force sensor 130 in the device 100. In order to carry out the operations, the controller 110 may be configured to store (e.g. in internal registers) or access (e.g. from memory 120) arrangement information defining the arrangement of the force sensors in the device 100, such as the relative locations of the force sensors, so as to carry out the arrangement-related operation based on the arrangement information. For example, such arrangement information may comprise the various correlation factors, weightings, weights and/or mappings described above, any of which may be updated on a dynamic basis.

Based on an output sensor signal generated in one of the arrangement-related operations, the controller 110 may be configured to determine that a user touch event (such as a user swiping, touching or pressing the device 100 in the vicinity of associated force sensors 130) has occurred.

Indeed, the controller 110 may be configured to control operation of the device 100 based on an output sensor signal generated in one of the arrangement-related operations. For example, the controller 110 may be configured to control operation of itself or of at least one of the input/output components of the I/O unit 140. In the context of haptic functionality, the controller 110 may be configured to control an LRA within the I/O unit 140 based on an output sensor signal generated in one of the arrangement-related operations.

As another example, an output sensor signal generated in one of the arrangement-related operations may be taken to be a user input in connection with a GUI (graphical user interface) displayed on a touchscreen of the device 100. Of course, numerous other example will occur to the skilled person, an output sensor signal generated in one of the arrangement-related operations simply serving as a generic user input which may be taken advantage of in any way.

As apparent from FIG. 1, it will be understood that the controller 110 alone as well as the device 100 comprising the controller 110 may embody the present invention.

Corresponding methods and computer programs may also embody the present invention.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in the claim, "a" or "an" does not exclude a plurality, and a single feature or other unit may fulfil the functions of several units recited in the claims. Any reference numerals or labels in the claims shall not be construed so as to limit their scope.

The invention claimed is:

1. A controller for a device which comprises at least two force sensors in a given arrangement, the controller operable, based on input sensor signals derived from the at least two force sensors, to carry out a localisation operation in which an output sensor signal is generated based on a given weighting associated with at least two said input sensor signals and defining a location of interest relative to locations of the at least two force sensors so that the output sensor signal of the localisation operation is representative of the location of interest, the input sensor signals being input sensor signals of the localisation operation, wherein the localisation operation comprises, in association with at least one of its output sensor signals, calculation of a further output sensor signal as a function of a first ratio of the input sensor signals concerned to one another and a second ratio defining the given weighting concerned.

2. The controller as claimed in claim 1, wherein the localisation operation is configured to generate a plurality of output sensor signals, each output sensor signal of the localisation operation being generated based on a given weighting associated with at least two said input sensor signals of the localisation operation and defining the location of interest relative to locations of the at least two force sensors so that each output signal of the localisation operation concerned is representative of the location of interest concerned.

3. The controller as claimed in claim 2, wherein at least two output sensor signals of the localisation operation are generated based on different given weightings and/or different input sensor signals of the localisation operation so that the at least two output sensor signals are different from one another.

4. The controller as claimed in claim 1, wherein the output sensor signal of the localisation operation results from a weighted combination of the at least two input sensor signals of the localisation operation concerned, the weighted combination weighted according to the given weighting concerned.

5. The controller as claimed in claim 4, wherein:
the weighted combination is a weighted average or a weighted sum; and/or
the output sensor signal of the localisation operation is representative of a force applied at the location of interest concerned.

6. The controller as claimed in claim 5, wherein the weighted average or the weighted sum comprises a sum of products, the products corresponding respectively to the input sensor signals of that weighted sum, and each product being a product of an input sensor signal and a corresponding weight defined by the given weighting concerned.

7. The controller as claimed in claim 1, wherein the output sensor signal of the localisation operation is calculated as the function of the first ratio of magnitudes of the input sensor signals concerned to one another and the second ratio defining the given weighting concerned.

8. The controller as claimed in claim 1, wherein:
the calculation comprises comparing the first ratio concerned with the second ratio concerned; and/or
the output sensor signal of the localisation operation calculated as a function of the first ratio concerned and the second ratio concerned is representative of whether a force applied is applied at the location of interest concerned or how close a location at which that force is applied is to the location of interest concerned.

9. The controller as claimed in claim 1, wherein the calculation comprises determining how close the first ratio concerned is to the second ratio concerned.

10. The controller as claimed in claim 1, wherein the first and second ratios are log ratios.

11. The controller as claimed in claim 1, wherein the calculation comprises calculating values constrained between defined upper and lower values using a Gaussian function whose input parameters comprise the first and second ratios concerned.

12. The controller as claimed in claim 1, wherein the given weighting comprises a series of weights corresponding respectively to the input sensor signals concerned of the localisation operation.

13. The controller as claimed in claim 1, wherein:
the given weighting is based on the arrangement of the at least two force sensors in the device and the location of interest concerned; and/or
the given said weighting is dependent on locations of the at least two force sensors in the device and the location of interest concerned.

14. The controller as claimed in claim 1, configured to store or access arrangement information defining the arrangement of the at least two force sensors in the device, such as the relative locations of the at least two force sensors,
wherein the controller is configured to carry out an arrangement-related operation based on the arrangement information.

15. The controller as claimed in claim 1, configured to determine a user touch event based on a said output sensor signal.

16. A device, comprising:
at least two force sensors in a given arrangement; and
the controller of claim 1, wherein the input sensor signals originate from respective force sensors of the device.

17. A controller for a device which comprises at least two force sensors, the controller operable, based on input sensor signals derived from the at least two the force sensors, to carry out a localisation operation in which an output sensor signal is generated as a function of a first ratio of at least two said input sensor signals to one another and a second ratio defining a weighting associated with said at least two said input sensor signals and defining a location of interest relative to locations of the at least two force sensors.

18. A controller for a device which comprises at least two sensors, the controller operable, based on input sensor signals derived from the at least two sensors, to carry out a localisation operation in which an output sensor signal is generated based on a given weighting associated with at least two said input sensor signals and defining a location of interest relative to locations of the at least two sensors so that the output sensor signal is representative of the location of interest, wherein said output sensor signal is calculated as a function of a first ratio of magnitudes of the input sensor signals concerned to one another and a second ratio defining the liven weighting concerned.

19. A controller for a device which comprises at least two force sensors in a given arrangement, the controller operable, based on input sensor signals derived from the at least two force sensors, to carry out a localisation operation in which an output sensor signal is generated based on a given weighting associated with at least two said input sensor signals and defining a location of interest relative to locations of the at least two force sensors so that the output sensor signal of the localisation operation is representative of the location of interest, the input sensor signals being input sensor signals of the localisation operation, wherein the output sensor signal of the localisation operation is calculated as a function of a first ratio of magnitudes of the input sensor signals concerned to one another and a second ratio defining the given weighting concerned.

\* \* \* \* \*

UNITED STATES PATENT AND TRADEMARK OFFICE
CERTIFICATE OF CORRECTION

PATENT NO. : 11,726,596 B2
APPLICATION NO. : 17/161268
DATED : August 15, 2023
INVENTOR(S) : Peso Parada et al.

Page 1 of 2

It is certified that error appears in the above-identified patent and that said Letters Patent is hereby corrected as shown below:

In the Specification

1. In Column 1, Line 6, delete "The present disclosure relates in general to a controller...... electronic device." and insert -- The present disclosure is a continuation of U. S. Non-Provisional Patent Application No. 16/369,738, filed Mar. 29, 2019, now U.S. Pat. No. 10,955,955, which is incorporated by reference herein in its entirety. --, therefor.

2. In Column 7, Line 30, delete "In some arrangements, other types of sensor may be employed." and insert the same on Column 7, Line 29, after "sensors.", as a continuation paragraph.

3. In Column 13, Line 15, delete "y2(n)=x2(n)c12*x1(n)" and insert -- y2(n)=x2(n)–c12*x1(n) --, therefor.

4. In Column 15, Line 25, delete "c12 (n+1)=max(0,c12)n+1)" and insert -- c12(n+1)=max(0,c12(n+1)) --, therefor.

5. In Column 15, Line 36, delete "$X_M = \underset{N \times N}{M} \circ (x^T(n) \times \vec{1})$" and insert -- $X_M = \underset{N \times N}{M} \circ (x^T(n) \cdot \vec{1})$ --, therefor.

6. In Column 15, Line 64, delete "$C(n+1)=C(n)-\mu_d C(n)=C(n)\cdot(1-\mu_d))$" and insert -- $C(n+1) = C(n) - \mu_d C(n) = C(n) \cdot (1 - \mu_d)$ --, therefor.

7. In Column 16, Line 3, delete "$C(n+1)=W)^\circ (C(n)+2\mu(X_M^T-C(n)^\circ X_M)\circ(x^T(n)\cdot \vec{1}+\epsilon))+1-W)^\circ (C(n)\cdot(1-\mu_d))$" and insert Signed and Sealed this
Fifteenth Day of April, 2025

Coke Morgan Stewart
*Acting Director of the United States Patent and Trademark Office*

CERTIFICATE OF CORRECTION (continued)
U.S. Pat. No. 11,726,596 B2

-- $$C(n+1) = W \circ \left( C(n) + 2\mu \left( X_M^T - C(n) \circ X_M \right) \oslash \left( x^T(n) \cdot \vec{1} + \epsilon \right) \right) + \left( 1 - W \right) \circ \left( C(n) \cdot (1 - \mu_d) \right)$$ --, therefor.

8. In Column 16, Line 52, delete "9400to" and insert -- 9400 to --, therefor.

9. In Column 18, Line 65, delete "VS3=0.5*S2+0.3*S3" and insert -- VS3=0.5*S2+0.5*S3 --, therefor.

10. In Column 19, Line 38, delete "1and" and insert -- 1 and --, therefor.

11. In Column 21, Line 6, delete "Gaussian radial basis function. The example...... output sensor signal." and insert the same on Column 21, Line 5, after "an unnormalized", as a continuation paragraph.

12. In Column 22, Line 52, delete "Corresponding methods and computer programs may also embody the present invention." and insert the same on Column 22, Line 51, after "invention.", as a continuation paragraph.

In the Claims

13. In Column 24, Line 36, in Claim 17, delete "two the force" and insert -- two force --, therefor.

14. In Column 24, Line 54, in Claim 18, delete "liven" and insert -- given --, therefor.